US007015954B1

(12) United States Patent
Foote et al.

(10) Patent No.: US 7,015,954 B1
(45) Date of Patent: Mar. 21, 2006

(54) AUTOMATIC VIDEO SYSTEM USING MULTIPLE CAMERAS

(75) Inventors: Jonathan Foote, Menlo Park, CA (US); Subutai Ahmad, Palo Alto, CA (US); John Boreczky, San Leandro, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/370,406

(22) Filed: Aug. 9, 1999

(51) Int. Cl.
H04N 5/225 (2006.01)
H04N 7/18 (2006.01)
H04N 5/232 (2006.01)

(52) U.S. Cl. ............... 348/218.1; 348/159; 348/211.11
(58) Field of Classification Search ............... 348/36, 348/39, 42, 47, 48, 211.11, 211.12, 211.99, 348/218.1, 37, 38, 159; 382/254, 276
See application file for complete search history.

(56) References Cited

U.S. PATENT DOCUMENTS

| 4,393,394 A | 7/1983 | McCoy |
| 4,395,093 A | 7/1983 | Rosendahl |
| 4,484,801 A | 11/1984 | Cox |
| 4,558,462 A | 12/1985 | Horiba |
| 4,583,117 A | 4/1986 | Lipton |
| 4,707,735 A | 11/1987 | Busby |
| 4,745,479 A | 5/1988 | Waehner |
| 4,772,942 A | 9/1988 | Tuck |
| 4,819,064 A | 4/1989 | Diner |
| 4,862,388 A | 8/1989 | Bunker |
| 4,868,682 A | 9/1989 | Shimizu et al. ............. 358/335 |
| 4,947,260 A | 8/1990 | Reed |
| 4,974,073 A | 11/1990 | Inova |
| 4,985,762 A | 1/1991 | Smith |

(Continued)

OTHER PUBLICATIONS

De Silva, L.D., K. Aizawa and M. Hatori, "Use of Steerable Viewing Window (SVW) to Improve the Visual Sensation in Face to Face Teleconferencing," in *Proc. ICASSP-94*, vol. 6, pp. 421-424, May 1994.

(Continued)

*Primary Examiner*—Thai Tran
*Assistant Examiner*—Luong T. Nguyen
(74) *Attorney, Agent, or Firm*—Fliesler Meyer LLP

(57) ABSTRACT

A camera array captures plural component images which are combined into a single scene from which "panning" and "zooming" within the scene are performed. In one embodiment, each camera of the array is a fixed digital camera. The images from each camera are warped and blended such that the combined image is seamless with respect to each of the component images. Warping of the digital images is performed via pre-calculated non-dynamic equations that are calculated based on a registration of the camera array. The process of registering each camera in the arrays is performed either manually, by selecting corresponding points or sets of points in two or more images, or automatically, by presenting a source object (laser light source, for example) into a scene being captured by the camera array and registering positions of the source object as it appears in each of the images. The warping equations are calculated based on the registration data and each scene captured by the camera array is warped and combined using the same equations determined therefrom. A scene captured by the camera array is zoomed, or selectively steered to an area of interest. This zooming- or steering, being done in the digital domain is performed nearly instantaneously when compared to cameras with mechanical zoom and steering functions.

24 Claims, 19 Drawing Sheets

U.S. PATENT DOCUMENTS

| | | | | |
|---|---|---|---|---|
| 5,023,720 | A | 6/1991 | Jardins | |
| 5,023,725 | A | 6/1991 | McCutchen | 358/231 |
| 5,040,055 | A | 8/1991 | Smith | |
| 5,068,650 | A | 11/1991 | Fernandez | |
| 5,083,389 | A | 1/1992 | Alperin | |
| 5,115,266 | A | 5/1992 | Troje | |
| 5,130,794 | A | 7/1992 | Ritchey | |
| 5,140,647 | A | 8/1992 | Ise | |
| 5,142,357 | A | 8/1992 | Lipton | |
| 5,153,716 | A | 10/1992 | Smith | |
| 5,170,182 | A * | 12/1992 | Olson et al. | 347/231 |
| 5,175,616 | A | 12/1992 | Milgram | |
| 5,185,667 | A | 2/1993 | Zimmerman | 358/209 |
| 5,187,571 | A * | 2/1993 | Braun et al. | 348/39 |
| 5,231,673 | A | 7/1993 | Elenga | |
| 5,258,837 | A | 11/1993 | Gormley | |
| 5,291,334 | A | 3/1994 | Wirth | |
| 5,302,964 | A | 4/1994 | Lewins | |
| 5,369,450 | A | 11/1994 | Haseltine | |
| 5,424,773 | A | 6/1995 | Saito | |
| 5,444,478 | A | 8/1995 | Lelong | |
| 5,465,128 | A | 11/1995 | Wah Lo | |
| 5,465,163 | A | 11/1995 | Yoshihara | |
| 5,469,274 | A | 11/1995 | Iwasaki | |
| 5,499,110 | A | 3/1996 | Hosogai | |
| 5,502,309 | A | 3/1996 | Davis | |
| 5,508,734 | A | 4/1996 | Baker | |
| 5,510,830 | A | 4/1996 | Ohia | |
| 5,539,483 | A | 7/1996 | Nalwa | |
| 5,548,409 | A | 8/1996 | Ohta | |
| 5,563,650 | A | 10/1996 | Poelstra | |
| 5,602,584 | A | 2/1997 | Mitsutake | |
| 5,608,543 | A | 3/1997 | Tamagaki | |
| 5,611,033 | A | 3/1997 | Pitteloud | |
| 5,619,255 | A | 4/1997 | Booth | 348/36 |
| 5,625,462 | A | 4/1997 | Ohta | |
| 5,646,679 | A | 7/1997 | Yano | |
| 5,649,032 | A | 7/1997 | Burt et al. | 382/284 |
| 5,650,814 | A | 7/1997 | Florent | |
| 5,657,073 | A * | 8/1997 | Henley | 348/38 |
| 5,657,402 | A | 8/1997 | Bender | |
| 5,666,459 | A | 9/1997 | Ohta | |
| 5,668,595 | A | 9/1997 | Katayama | |
| 5,680,150 | A | 10/1997 | Shimizu | |
| 5,682,198 | A | 10/1997 | Katayama | |
| 5,689,611 | A | 11/1997 | Ohta | |
| 5,691,765 | A | 11/1997 | Schieltz | |
| 5,699,108 | A | 12/1997 | Katayama | |
| 5,703,604 | A | 12/1997 | McCutchen | |
| 5,721,585 | A | 2/1998 | Keast | |
| 5,745,305 | A | 4/1998 | Nalwa | |
| 5,760,826 | A | 6/1998 | Nayar | |
| 5,768,443 | A | 6/1998 | Michael et al. | |
| 5,790,181 | A | 8/1998 | Chahl | |
| 5,812,704 | A | 9/1998 | Pearson | |
| 5,838,837 | A | 11/1998 | Hirosawa | |
| 5,841,589 | A | 11/1998 | Davis | |
| 5,848,197 | A | 12/1998 | Ebihara | |
| 5,870,135 | A | 2/1999 | Glatt | |
| 5,903,303 | A | 5/1999 | Fukushima | |
| 5,920,376 | A | 7/1999 | Bruckstein | |
| 5,920,657 | A | 7/1999 | Bender | |
| 5,940,641 | A | 8/1999 | McIntyre | |
| 5,956,418 | A * | 9/1999 | Aiger et al. | 382/154 |
| 5,966,177 | A * | 10/1999 | Harding | 348/383 |
| 5,973,726 | A | 10/1999 | Iijima | |
| 5,978,143 | A | 11/1999 | Spruck | |
| 5,982,452 | A | 11/1999 | Gregson | |
| 5,982,941 | A | 11/1999 | Loveridge | |
| 5,982,951 | A | 11/1999 | Katayama | |
| 5,987,164 | A | 11/1999 | Szeliski | |
| 5,990,934 | A | 11/1999 | Nalwa | |
| 5,990,941 | A | 11/1999 | Jackson | |
| 6,002,430 | A | 12/1999 | McCall | |
| 6,005,987 | A | 12/1999 | Nakamura | |
| 6,009,190 | A | 12/1999 | Szeliski | |
| 6,011,558 | A | 1/2000 | Hsieh | |
| 6,028,719 | A | 2/2000 | Beckstead | |
| 6,040,852 | A | 3/2000 | Stuettler | |
| 6,043,837 | A | 3/2000 | Driscoll | |
| 6,044,181 | A * | 3/2000 | Szeliski et al. | 382/284 |
| 6,064,760 | A | 5/2000 | Brown | |
| 6,078,701 | A | 6/2000 | Hsu et al. | 382/294 |
| 6,097,430 | A | 8/2000 | Komiya | |
| 6,097,854 | A | 8/2000 | Szeliski | |
| 6,111,702 | A | 8/2000 | Nalwa | |
| 6,115,176 | A | 9/2000 | Nalwa | |
| 6,118,474 | A | 9/2000 | Nayar | |
| 6,128,416 | A | 10/2000 | Oura | |
| 6,144,501 | A | 11/2000 | Nalwa | |
| 6,148,118 | A | 11/2000 | Murakami | |
| 6,173,087 | B1 * | 1/2001 | Kumar et al. | 382/284 |
| 6,175,454 | B1 | 1/2001 | Hoogland | |
| 6,188,800 | B1 * | 2/2001 | Okitsu | 382/276 |
| 6,195,204 | B1 | 2/2001 | Nalwa | |
| 6,211,911 | B1 | 4/2001 | Komiya | |
| 6,215,914 | B1 | 4/2001 | Nakamura | |
| 6,452,628 | B1 | 9/2002 | Kato | |
| 6,526,095 | B1 * | 2/2003 | Nakaya et al. | 375/240.16 |

OTHER PUBLICATIONS

Elko, Gary and Anh-Tho Nguyen Pong, "A Steerable amd Variable First-Order Differential Microphone Array," in *Proc. ICASSP 97*.

Huang, Q., et al., "Content Based Active Video Data Acquisition Via Automated Cameramen," *Proc. ICIP*, Jan. 1998.

IPLX, the Interactive Pictures Corporation, www.ipix.com.

Majumder, Aditi, et al., "Immersive Teleconferencing: A New Algorithm to Generate Seamless Panoramic Video Imagery," in Proc. ACM Multimedia, Oct. 1999.

Mann, S. and R.W. Picard, "Video Orbits of the Projective Group: A New Perspective on Image Mosaicing," MIT Media Lab, Technical Report 338.

Shum, H.Y. and R. Szeliski, "Panoramic Image Mosaicing," Technical Report MSR-TR-97-23, Microsoft Research, Sep. 1997. (www.research.microsoft.com/scripts/pubdb/trpub. asp).

Swaminathan, Rahul and Shree K. Nayar, "Non-Metric Calibration of Wide-Angle Lenses and Polycameras," in Proc. CVPR, 1999, IEEE.

Taniguchi, Y., A. Akutsu and Y. Tonomura, "PanoramaExcerpts: Extracting and Packing Panoramas for Video Browsing," in *Proc. ACM Multimedia 97*, Seattle, WA, pp. 427-436, 1997.

Teodosio, L. and W. Bender, "Salient Video Stills: Content and Context Preserved," in *Proc. ACM Multimedia 93*, Anaheim, CA, pp. 39-46, 1993.

Wang, C. and M. Brandstein, "A Hybrid Real-Time Face Tracking System" in *Proc. ICASSP '98*.

Wolberg, G., "Digital Image Warping," *IEEE Computer Society Press*, 1992.

Wren, C., A. Azarbayejani, T. Darrell and A. Pentland, "Pfinder: Real-Time Tracking of the Human Body," in *IEEE Transactions on Pattern Analysis and Machine Intelligence*, Jul. 1997, vol. 19, No. 7, pp. 780-785.

Bennett, F. and Hopper, A., "Developments in Networked Multimedia," May 1995.

Chen, S. and Williams, L., "View Interpolation for Image Synthesis," Apple Computer, Inc. 7 pages. There is no publication date.

Mann, S., "Compositing Multiple Pictures of the Same Scene," *Proc. 46th Annual Imaging Science and Technology Conference*, Cambridge, Massachusetts, May 1993.

"OmniSight™ Solutions for Natural Meetings™: Technical Specifications for Typical System."

Operating Instructions, Sony EVI-D30 Color Video Camera. Japanese Language. No English Translation.

Smith, B. and Rowe, L., "Compressed Domain Processing of JPEG-Encoded Images," *Real-Time Imaging Journal*, http://www.cs.cornell.edu/zeno/Papers/cdp/cdp_rtij96.pdf.

Chu, Peter L., "Superdirective Microphone Array for a Set-Top Videoconferencing System," in *Proc. ICASSP 97*.

* cited by examiner

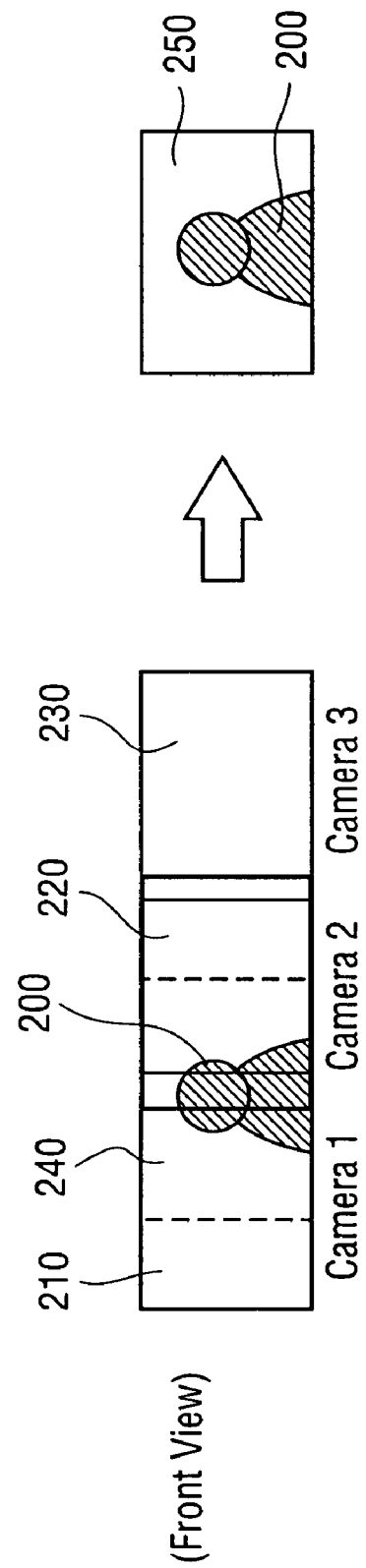

AUTOMATIC VIDEO SYSTEM USING MULTIPLE CAMERAS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to video systems and composition of multiple digital images. The invention is more particularly related to the composition of multiple digital images each captured by an individual camera of a camera array, and to a method of warping at least portions of images so that the images can be combined, without overlap or inconsistent pixels, into a single image. The invention also related to the registration of multiple cameras and the determination of a transformative equation that allows fast warping and summation of plural images from the multiple cameras to produce a single image. The invention is also particularly related to digital panning and zooming of a scene captured by a multiple camera array, and the automatic control of pan and zoom of an individually controlled camera or camera array.

2. Discussion of the Background

Remote and locally located cameras typically include devices for camera control. Devices include stepping motors or other mechanisms configured to point the camera or an image capturing device toward a scene or point of interest. Examples include teleconferencing applications, surveillance cameras, security cameras, cameras that are remotely controlled, activated by motion, light or other stimuli, remote sensing cameras such as those placed on robotic means (examples including those used in space exploration, deep sea diving, and for sensing areas or scenes to dangerous or inaccessible for normal camera operations (inside nuclear reactor cores, inside pipes, police cars, or law enforcement robotics, for example).

Normally, cameras are manually operated by a human operator on site, or remotely controlling the camera via a steering input (joystick or mouse, for example). In the case of remotely steered cameras, steering inputs generally activate a control program that sends commands to a stepping motor or other control device to steer a camera toward an object, item, or area of interest. General zooming functions of the camera may also be activated either on site or remotely.

In the case of teleconferencing applications (meetings, lectures, etc.), a variable angle camera with a mechanical tilt pan, focal length, and zoom capability is normally used. Such devices generally require a human operator to orient, zoom, and focus a video or motion picture camera. In some cases, conference participants may be required to activate a specific camera or signal attention of a camera configured to zoom in or focus on selected areas of a conference room.

Multiple cameras have been utilized in a number of applications. For example, Braun et al., U.S. Pat. No. 5,187,571, "TELEVISION SYSTEM FOR DISPLAYING MULTIPLE VIEWS OF A REMOTE LOCATION," teaches an NTSC camera array arranged to form an aggregate field, and Henley, U.S. Pat. No. 5,657,073, "SEAMLESS MULTI-CAMERA PANORAMIC IMAGING WITH DISTORTION CORRECTION AND A SELECTABLE FIELD OF VIEW," teaches a system for production of panoramic/panospheric output images.

Applications for multiple or steerable cameras include teleconferencing systems that typically direct a camera toward a speaker who is then broadcast to other teleconference participants. Direction of the camera(s) can be performed manually, or may utilize a tracking mechanism to determine a steering direction. Some known tracking mechanisms include, Wang et al., "A Hybrid Real-Time Face Tracking System," in Proc. ICASSP ▯98, and, Chu, "Superdirective Microphone Array for a Set-Top Videoconferencing System," In Proc. ICASSP ▯97.

However, technical challenges and costs have prevented such systems from becoming common and in wide spread use.

Systems attempting to integrate multiple images have failed to meet the needs or goals of users. For) example, McCutchen, U.S. Pat. No. 5,703,604, "IMMERSIVE DODECAHEDRAL VIDEO VIEWING SYSTEM," teaches an array of video cameras arrayed in a dodecahedron for a complete spherical field of view. Images are composed at the receiving end by using multiple projectors on a hemispherical or spherical dome. However, the approach taught in McCutchen will suffer problems at image boundaries, as the multiple images will not register perfectly and result in obvious "seams."

In another example, Henley et al., U.S. Pat. No. 5,657,073, "SEAMLESS MULTI-CAMERA PANORAMIC IMAGING WITH DISTORTION CORRECTION AND SELECTABLE FIELD OF VIEW," teaches combination of images from radially-arranged cameras. However, Henley fails to disclose any but radially-arranged cameras, and does not provide details on image composition methods.

SUMMARY OF THE INVENTION

The present inventors have realized the utility of an array of cameras for image and video capturing of a scene, including a fixed camera array capable of zooming and panning to any of selected areas within the scene. Roughly described, the present invention utilizes a camera array to capture plural piecewise continuous images of a scene. Each of the images are combined, via at least warping and fading techniques, to produce a single seamless image of the scene. Selected areas of the scene are then zoomed in, or panned to, taking portions of the seamless image and displaying them to a user.

In one embodiment, images are combined from an array of inexpensive video cameras to produce a wide-field sensor. The wide field sensor is utilized to locate people or regions of interest (image them for teleconferencing purposes, for example). By tracking shape, motion, color, and/or audio cues, the location of people or other items of interest in the room or scene being captured by the cameras can be estimated.

The present inventors have planned to make the present invention economical in terms of manufacturing costs and computational costs in terms of speed and calculations required to combine the separate images from the camera array. In a primary embodiment, the camera array is a digital camera array, each camera having a fixed position. The cameras are registered such that the processing equipment used to combine the images knows which parts of each image are overlapping or have same points of the scene captured such that they may be precisely combined into a single image or scene.

Each of the images captured are warped so that the same points of a scene captured by two or more cameras are combined into a single point or set of points appropriately positioned according to the scene being captured. Blending techniques are then applied to edges of each of the images to remove any brightness or contrast differences between the images being combined.

Once the scene is combined into a single image, portions of the single image are selected for panning or zooming. An output or display is then provides the image to a user or to another device (for transmission to a remote location, for example).

The present inventors have also enhanced the invention by utilizing an automatic selection of images to be displayed via panning, zooming, or other imaging technique. For example, in one embodiment, directional microphones may be utilized to determine a direction in which activity is taking place in the scene, and the camera array is automatically panned to that portion of the scene. In another embodiment, motion detectors are utilized to determine motion and direct a panning operation of the camera array.

It is worth noting the camera array is not panned in the normal sense of camera panning, but the panned image is selected from a scene image composed from the several cameras.

Unlike prior art using steerable cameras, the present invention, if properly configured, subjects are always in view of the camera array. Digitally combining array camera images results in a seamless high-resolution image, and electronically selecting a region of the camera array view results in a rapidly steerable "virtual camera."

New CMOS camera chips will be both better and far less expensive than the current widely used CCD camera chips. By tracking shape, motion, and/or color cues, the location of subjects in the room can be determined. Unlike prior art tracking systems using steerable cameras, the subject is always in view and can't get "lost." The camera array can be used as a sensor to control conventional steerable cameras. Additionally, video images from adjacent cameras are digitally composited to give a seamless panoramic video image. This can be used to electronically "pan" and "zoom" a "virtual camera".

Virtual cameras are controlled electronically without physical motion, and so do not suffer from the physical limitations of mechanically controlled cameras, such as finite rates of zoom or pan. An additional benefit is that a plurality of images can be extracted, so that different users can view different regions of the same scene, which is impossible for a conventional camera.

Because images are composited in the digital domain, they are available for additional processing and sensing, unlike prior-art analog approaches. In this system, an appropriate camera view can be automatically determined by finding motion or human images. Thus the system can serve as an automatic camera operator, by steering a real or virtual camera at the most likely subjects. For example, in a teleconference, the camera can be automatically steered to capture the person speaking. In a lecture application, the camera can automatically detect both the lecturer's location and when new slides or other visuals are displayed. When a new slide is displayed, the virtual camera can be steered to encompass the entire slide; when the lecturer moves or gestures the virtual camera can be zoomed in for a closer shot. Also, it is possible for remote viewers to control their own virtual cameras; for example, someone interested in a particular feature or image on a projected slide could zoom in on that feature while others see the entire slide.

The present invention includes methods for steering a virtual camera to interesting regions as determined by motion and audio captured from multiple sensors. Additionally, the present invention includes methods for real-time recording and playback of a panoramic video image, arbitrary sensor array geometries, and methods of calibrating multiple cameras. The present invention also includes software and or devices capable of each of the above and for providing automatic image selection from a panoramic video image using motion analysis; automatic image selection using audio source location; automatic image selection using a combination of audio and motion analysis; each of the above features augmented with a face- or person-tracking system; a system for real-time recording and playback of panoramic video; arbitrary camera array configurations, including planar and linear; and methods for calibrating multiple cameras fixed with respect to each other.

The present inventors have also realized the utility of combining the camera array as described above along with a camera that is mechanically panned or steered (pointing a capture lens (optics) of the camera toward the object or area being panned or steered to). For example, the camera array may determine a direction to which the mechanically steered camera is pointed.

The present invention may be realized in a method, comprising the step of warping a set of images synchronously captured from a camera array into a common coordinate system of a composite image. The invention is also a method of controlling a virtual camera having a view selected from an array of cameras, comprising the steps of combining images from each of said cameras into a panoramic view, detecting motion in said panoramic view, and directing a view of said virtual camera based on said motion.

The present invention may be embodied in a device, or a camera array, comprising, a set of cameras mounted in an array, an image combining mechanism configured to combine at least two of images captured from said set of cameras into a composite image, a view selection device configured to select a view from the composite image, and an output mechanism configured to display the selected view. The invention also includes a method of registering a camera array, comprising the steps of, placing at least one registration point in a field of view of at least two cameras of said camera array, identifying a location of each registration point in a field of view of each camera of said array, and maintaining information about each registration point in relation to each camera such that images may be combined in relation to said registration points.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2A is an illustration of combined images from multiple cameras and a selection of a "virtual camera" view according to the present invention;

DESCRIPTION OF THE PREFERRED EMBODIMENTS

Figure 1A:
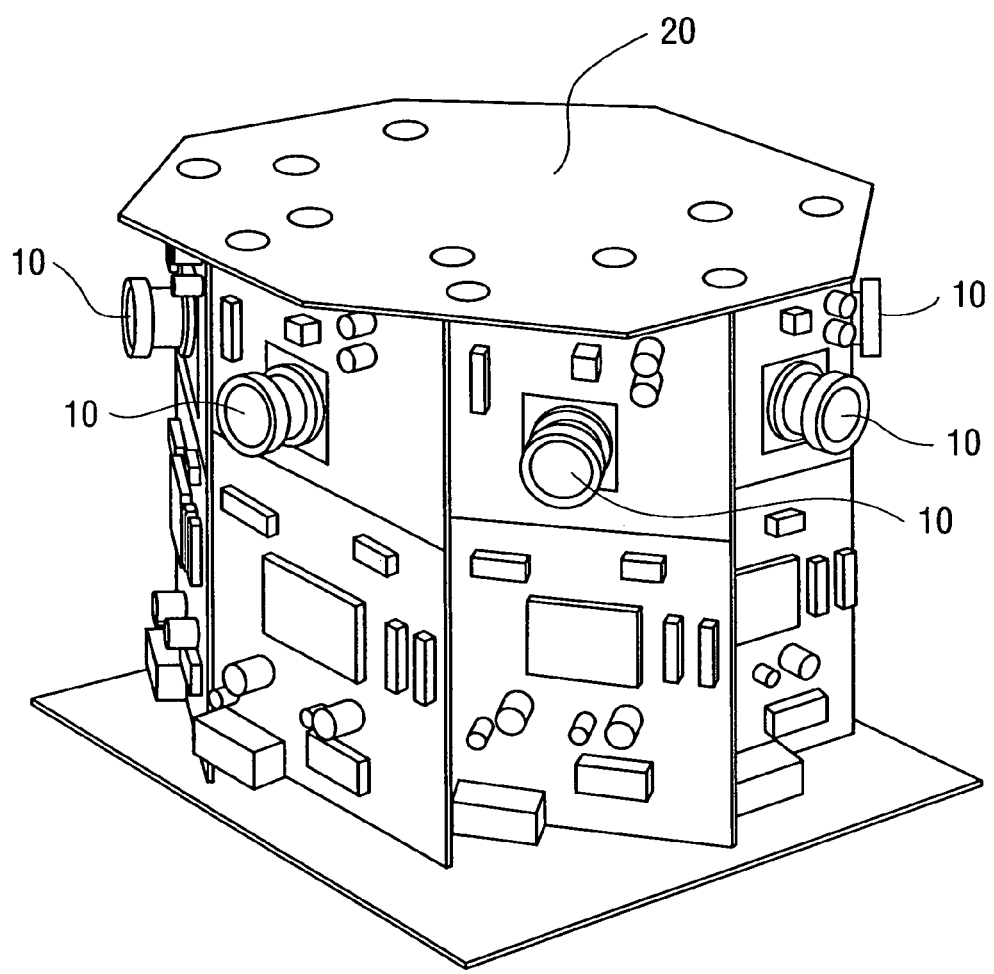
FIG. 1A is an example of a circular array of video cameras according to the present invention.

Referring now to the drawings, wherein like reference numerals designate identical or corresponding parts, and more particularly to FIG. 1A thereof, there is illustrated is an example of a circular array of video cameras according to the present invention. In FIG. 1A, multiple video cameras 10 are mounted on a rigid substrate 20 such that each camera's field of view overlaps or abuts that of its neighbor. The resulting images are aligned using digital warping and combined to form a large composite image. The result is a seamless high-resolution video image spanning the field of view of all cameras. If the cameras are mounted in fixed positions relative to each other, image registration between the different cameras is also fixed, and the same composition function can be used for each frame. Thus the interpolation parameters need only be calculated once, and the actual image composition can be done quickly and efficiently, even at video rates.

Figure 1B:
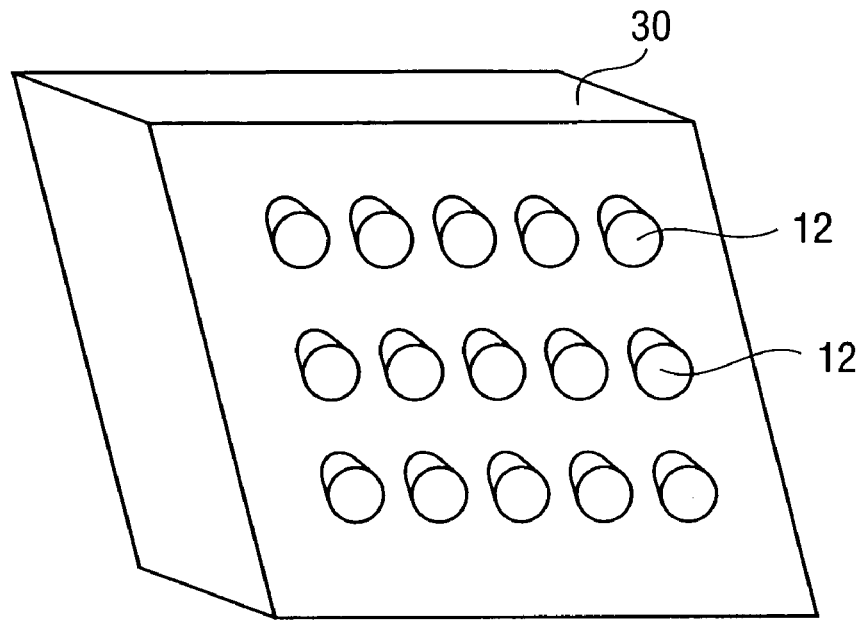
FIG. 1B is an example planar array of digital cameras according to the present invention.
Figure 1C:
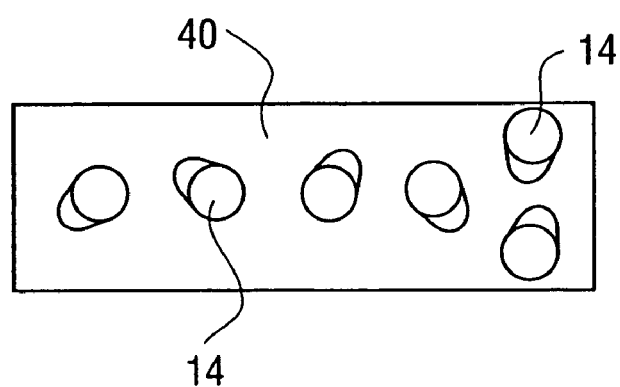
FIG. 1C is a second example of a linear array of digital cameras according to the present invention.

Other configurations of cameras are also possible. For example, FIG. 1B illustrates a planar array of cameras 12 mounted on a rigid plane substrate 30, and FIG. 1C illustrates a linear array of cameras 14, each mounted on a rigid substrate 40. The cameras may be aligned in various directions. For example, in FIG. 1B, the cameras are generally aligned in a same direction (with overlapping views as described above), while a more diverse alignment is seen in FIG. 1C (still generally having overlapping and abutting areas, for example).

For many applications, such as video conferencing, it is neither desirable nor possible to transmit a full-motion super-resolution image. This Invention Proposal describes methods for extracting a normal-resolution image using measures of motion, audio source location, or face location within the image. However, since multiple cameras and plural images of a same scene are envisioned, super-resolution processes (getting higher resolution, e.g., more pixels, from multiple images of a same scene) may be applied. When the multiple images are registered, any normal-sized sub-image can then be selected by excerpting a frame from the larger composite, as shown in FIG. 2.

FIG. 2A illustrates views from 3 cameras, camera 1 view 210, camera 2 view 220, and camera 3 view 230. A conference participant 200, and the participants frame of reference (an area of interest 240) is at or near abutting images from each of camera 1 view 210 and camera 2 view 220. The abutting areas are combined into a single panoramic image and the area of interest 240 (including participant 200) is selected therefrom. Camera 3 view 230 may also be combined into the single panoramic image, or, alternatively, because it shows none of the area of interest 240, it may be discarded. The selected combined image 250 (representing the area of interest 240) is the result.

Because the present invention allows any desired sub-image to be selected, changing the selected region is equivalent to steering a "virtual camera." The camera array can be constructed with long-focal-length cameras, such that each array element is "zoomed in" on a small region. Combining many of these zoomed-in images and reducing the resolution is equivalent to zooming out. Thus all the parameters of conventional cameras such as pan (selecting a different area of the panoramic image), zoom (combining or discarding images and changing resolution), and tilt (selecting images from cameras at specific angles, i.e., elevated cameras, for example) can be effectively duplicated with an array of fixed cameras.

Unlike mechanically-steered cameras which have a finite slew rate limited by motor speed and inertia, a virtual camera can be instantaneously panned anywhere in the camera array's field of view. Multiple virtual cameras can be simultaneously extracted from the same array, allowing multiple users to view different areas at the same time. This might be particularly useful in telepresence applications, for example a sports event, where each user could control a "personal virtual camera."

Figure 2B:
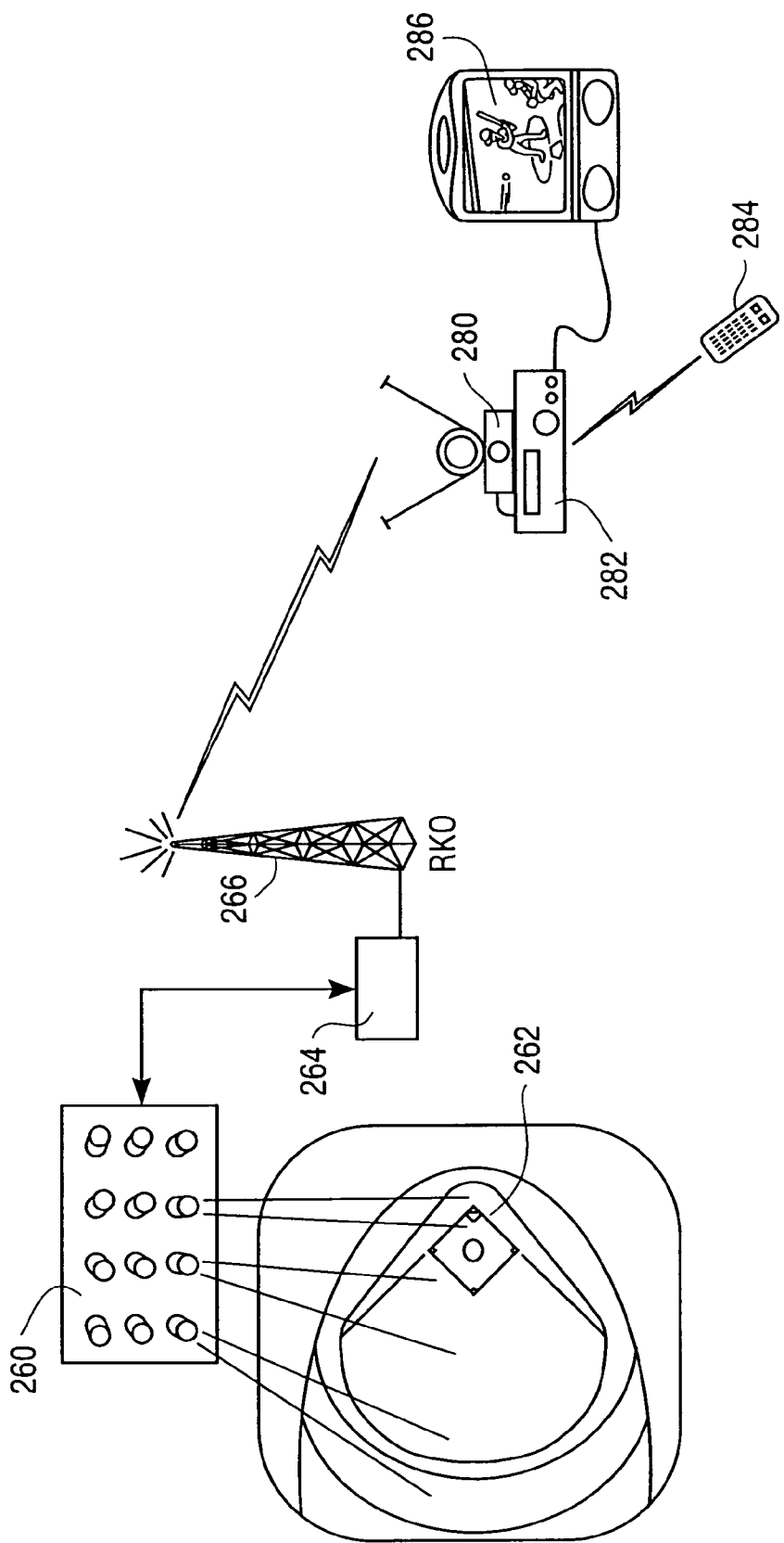
FIG. 2B is a block diagram/illustration of some of the possible applications of the processes of the present invention.

For example, one embodiment of the present invention is illustrated in FIG. 2B.

A camera array 260 is trained on, for example, a sporting event 262. Video streams from the cameras are then packaged, compressed, and prepared for broadcast at a broadcast station 264, and broadcast via cable, Internet, airwaves (broadcast tower 264, for example), or other broadcasting media/modes. At a receiving end, a receiving device (antennas 280, for example), receive the broadcast signal, and a user station 282 combines the images received in the broadcast to a single panoramic view. A user (not shown) selects a desired view via control device 284, resulting in a display 286, for example.

To save broadcast bandwidth, signals from control device 284 may be broadcast back to a source (broadcast station 264 in this example) to identify only the specific video streams needed to produce the display 286. In another alternative the entire display 286 may be composed at the source and only the display 286 is broadcast to the user. A specific configuration would be selected based on the availability of broadcast bandwidth and processing power available at each of the broadcast station 264 and user station 282. As will be appreciated by those skilled in the art, any number of combinations or modifications may be implemented, consistent with the invention as described herein.

Camera arrays can have any arrangement, such as radial (FIGS. 1A and 3, for example), linear, planar (FIGS. 1B, 1C, and 4, for example), covering the walls of a room, or even attached to the edge of a table or other object. A location and angle of each of the cameras in the camera array is fixed with respect to each other camera. Therefore, the entire camera array may be moved without any re-calibration (re-registration) or recalculation of the matrix equations for transforming the individual images into a single panoramic scene.

Although normally fixed on a platform or other substrate, it is consistent with this invention to have a camera array with cameras movable with respect to each other and employ a registration process that would re-register each camera in the camera array after movement. In addition, facilities for additional or auxiliary cameras to be attached or included in the array, and again, a registration process so that any cameras added to the array can benefit from the fast warping/transformation techniques described herein.

Figure 3:
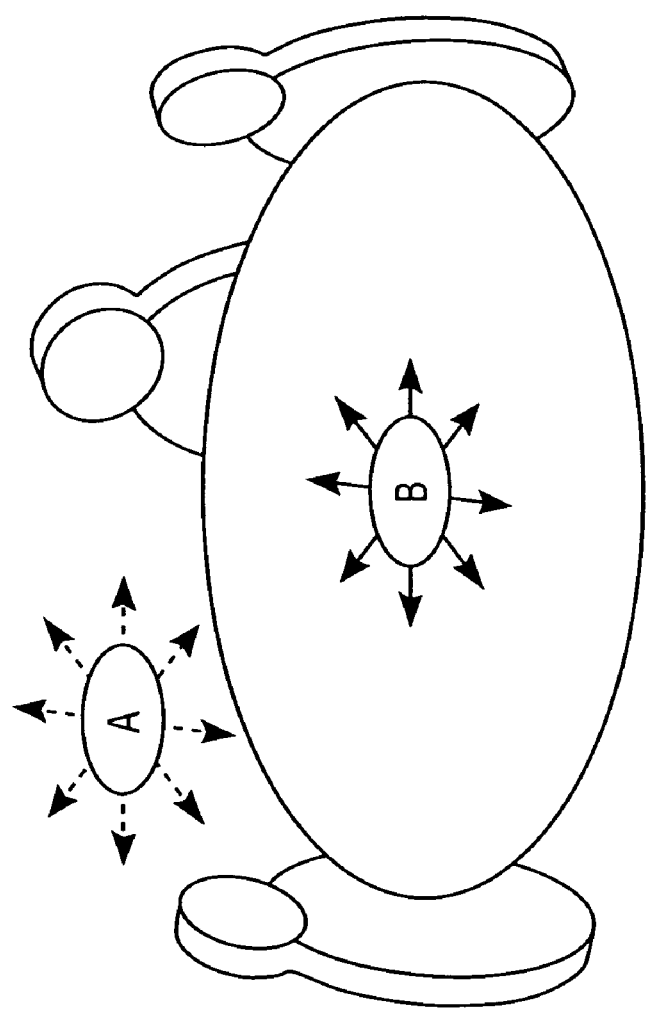
FIG. 3 is an illustration showing example placement and example camera angles of a circular camera utilized in a teleconferencing application according to the present invention.

Referring now to FIG. 3, a radial array of cameras is suitable for video conferencing, having a 360-degree field of view, the radial array is centered on a fixed point, such as the center of a conference table (labeled "B" in FIG. 3). A similar array is useful for immersive telepresence or other applications (discussed below). An array situated at "B," in FIG. 3, gives the impression of being seated at the table.

A similar array could be mounted on a mobile platform for other telepresence applications. The ability to instantaneously pan without distracting camera motion is an improvement over current telepresence systems. For example, another application, police robotics, require a mechanized camera to proceed into a hostile environment for reconnaissance purposes. Mobile and equipped with a video camera, remote panning means, and microphones, the devices proceed into a hostile environment. When a threat is detected, the camera pans toward the threat to check it out, however, the device is limited by pan and zoom time parameters. Alternatively, a radial array according to the present invention, mounted on the same robotic device, would be able to instantly pan to evaluate the threat, have multiple redundancy of cameras, and be able to self locate the threat via microphone or motion detection as described hereinbelow.

Camera arrays can be constructed in any desired configuration, and put anywhere convenient. A two-dimensional camera array may be constructed to facilitate electronic zooming as well as panning. For example, a first dimension of an array might cover/or be directed towards a full view of a conference room or scene, while a second array would have cameras directed toward specific points of interest within the scene (see FIG. 1C, for example). Example placement of camera arrays would include an edge of a table, on the ceiling at an angle, or even covering an entire wall or walls of a room. Automatic switching or electronic panning could then ensure an appropriate image of any event in the room, and no part of any scene would ever be out of camera view.

Figure 4A:
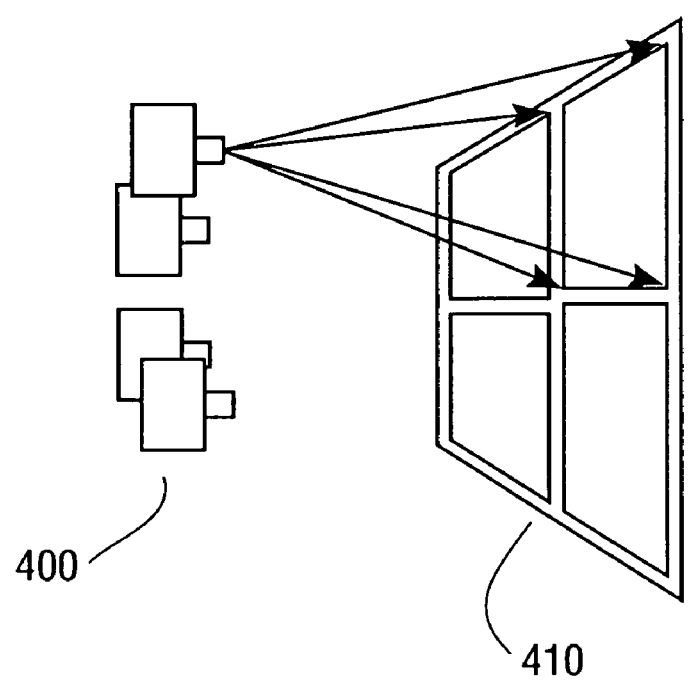
FIG. 4A is an illustration of a planar camera array.

FIG. 4A shows another application having cameras 400 arrayed in a planar configuration. Each of cameras 400 is directed to a specific one of abutting regions 410, and a user may select any view covered by any combination of the cameras, allowing up/down panning as well as a good zoom range.

Figure 4B:
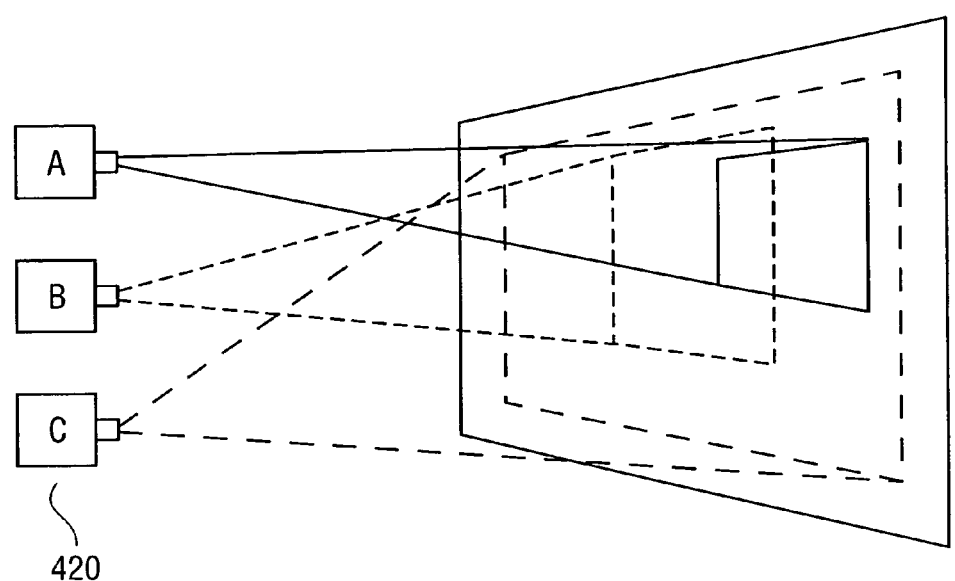
FIG. 4B is an illustration of a planar camera array and example specific views onto a scene.
Figure 4C:
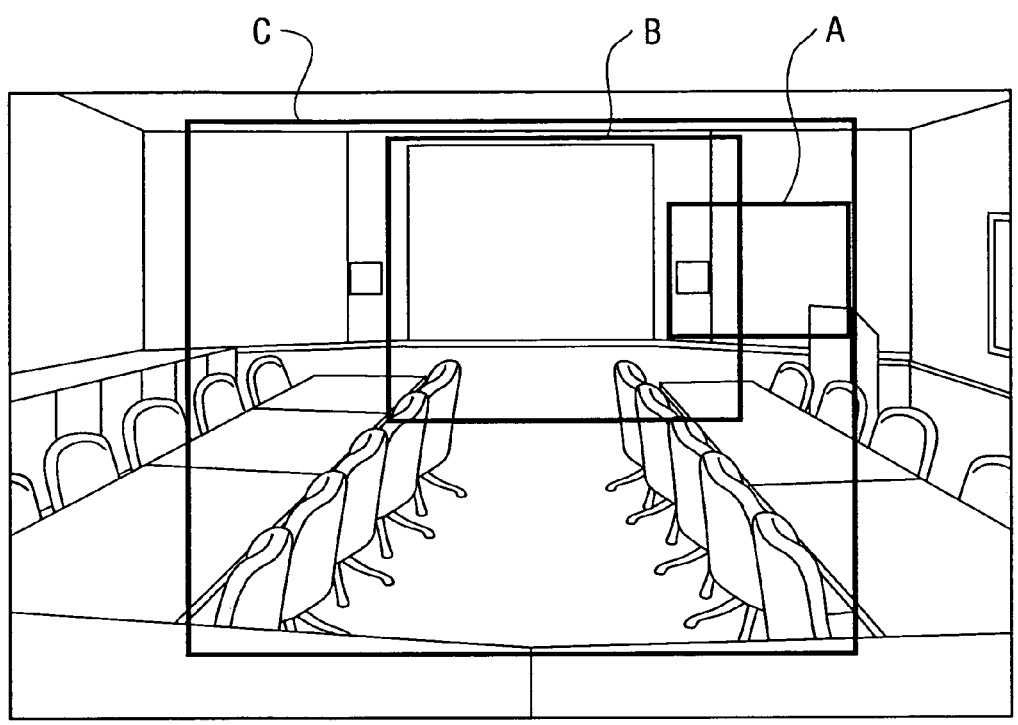
FIG. 4C is a conference/presentation room illustrating views A, B, and C of a camera array.

FIG. 4B illustrates an alternate configuration having cameras 420 (A, B, and C, respectively) directed to specific areas, either abutting or overlapping other camera views. In this case, specific camera views are directed toward areas of particular interest within a scene (resulting in views A, B, and C, as shown in FIG. 4C, for example). The configuration of FIGS. 4B/4C is appropriate for a lecture or conference room application, where the appropriate camera operations is to zoom and pan to follow the speaker, zoom in on the display screen, and zoom out to cover audience questions or reactions.

The prior art has failed to adequately resolve the challenging technical constraints of a camera array. Several major problems must be addressed: combining multiple video streams into a seamless composite, calibrating the array cameras, and handling the extreme data rate of the composite high-resolution video.

Figure 5A:
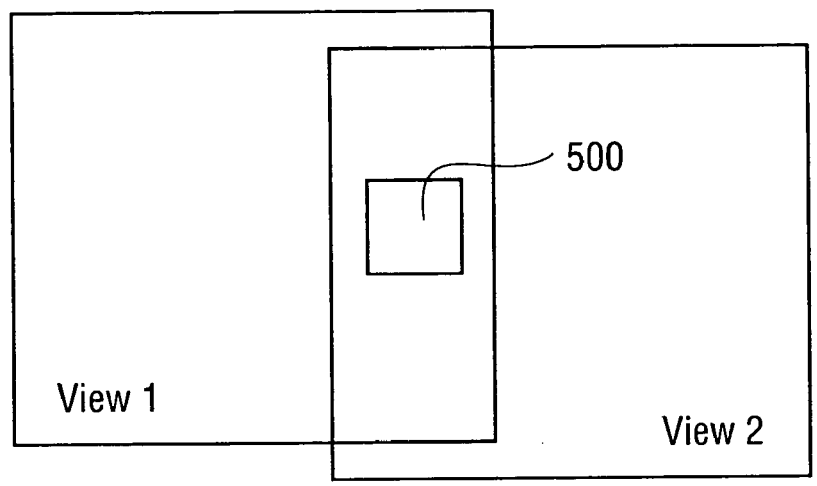
FIG. 5A is an example of an object to be imaged by two separate cameras.

Frame Compositing:

Stitching adjacent frames together is accomplished using a method or combination of methods that combine separate images into a panoramic, or combined image. In one embodiment, a spatial transformation (warping) of quadrilateral regions is used, which merges two images into one larger image, without loss of generality to multiple images. First, a number of image registration points are determined; that is, fixed points that are imaged at known locations in each sub-image. This can be done either manually or automatically. In either case the process involves pointing the array at a known, structured scene and finding corresponding points. For example, FIG. 5A illustrates views of two cameras trained on a scene that includes a rectangular box 500. The rectangular box 500 is in an area of overlap between a View 1 and View 2 (each View 1 and View 2 corresponding to an approximate field of view captured from one of the two cameras). Therefore, each of the points of rectangular box 500 would constitute image registration points (points in common to views of each of two or more cameras of the camera array).

Figure 5B:
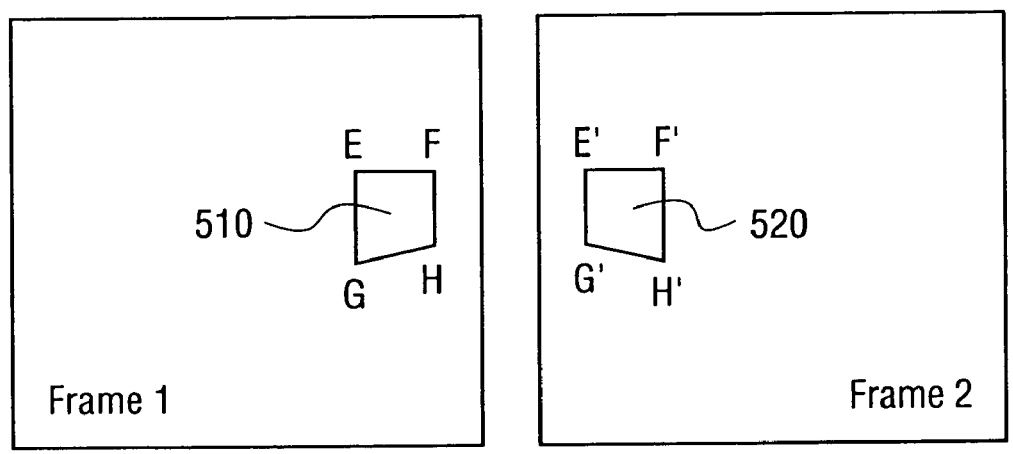
FIG. 5B is an example of frames from individual cameras imaging a same object.

FIG. 5B illustrates the rectangular box 500 as captured in an actual frame of the two cameras corresponding to View 1 and View 2 of FIG. 5A, as abutting frames, frame 1 and frame 2. The box is a quadrilateral area EFGH 510 in frame 1, and E'F'G'H' 520 in frame 2, and, because of the slightly different camera angles, the quadrilateral areas are not consistent in angular construction. Therefore, the present invention matches the abutting frames by warping each of the quadrilateral regions into a common coordinate system. Note that the sides of quadrilateral area EFGH are shown as straight, but will actually be subject to some barrel or pincushion distortion, which may also be approximately corrected via the fast warping equations (discussed below). Barrel/pincushion distortion can be corrected using radial (rather than piecewise linear) transforms. Piecewise linear transforms can fix an approximation of the curve.

Alternatively, only one of the images need to be warped to match a coordinate system of the other image. For example, warping of quadrilateral area EFGH may be performed via a perspective transformation. Thus quadrilateral EFGH in Frame 1 can be transformed to E'F'G'H' in the coordinate system of Frame 2.

Figure 6:
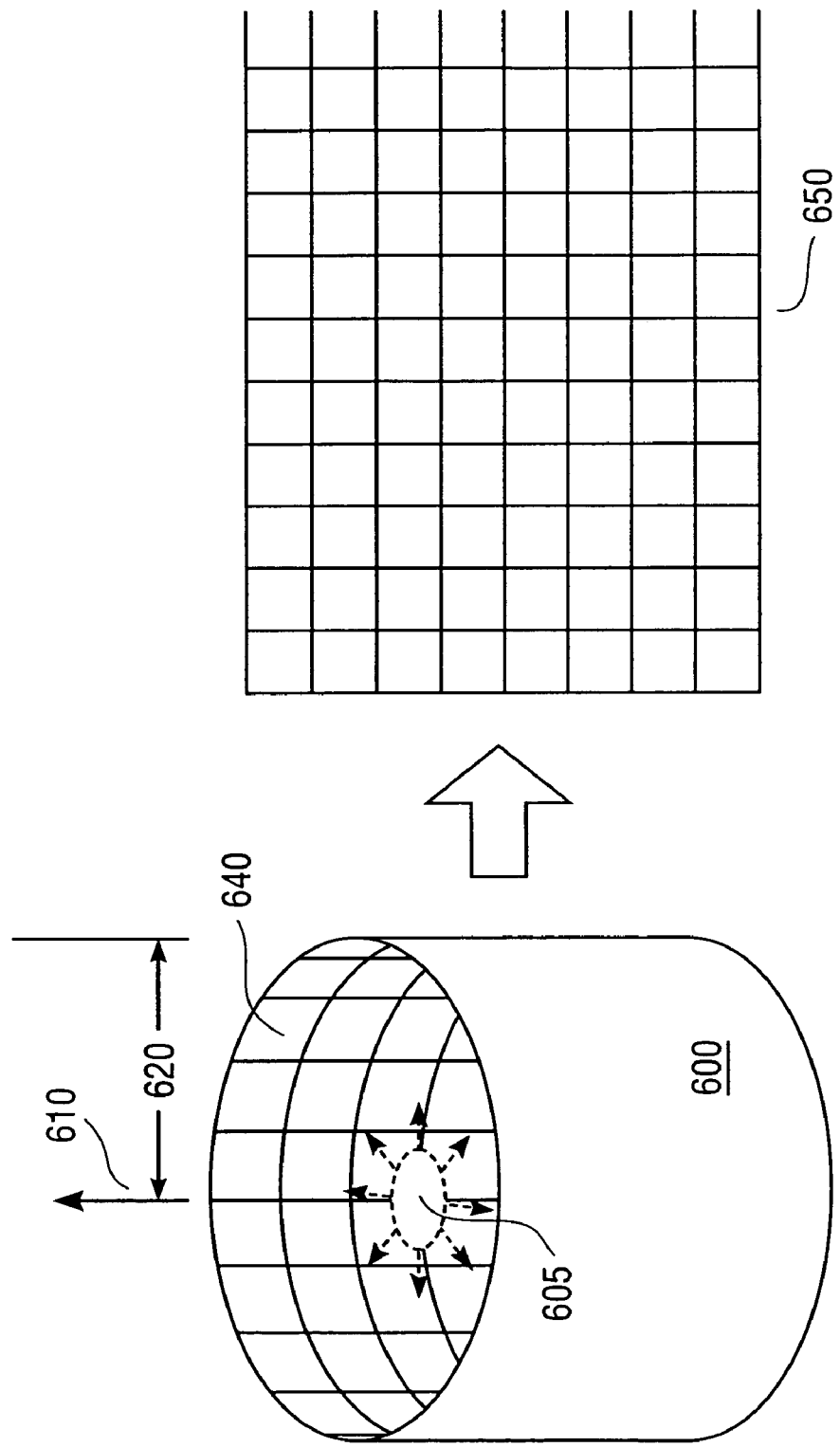
FIG. 6 is an example of calibration points and patches in raw images and an illustration of a flat panorama constructed from the raw images according to the present invention.

In another embodiment, bilinear warping (transformation) of piecewise-contiguous quadrilateral regions is used. Referring now to FIG. 6, an example of how multiple images are merged into one larger image, without loss of generality to the multiple images (also referred to as sub-images). First, a number of image registration points are determined; that is, fixed points that are imaged at known locations in each sub-image. In this embodiment, the fixed points at known locations consist of a cylinder 600 coaxial with a camera array axis 610, and having a radius 620 of about the working range of the camera (in the current embodiment, about a meter. A wide angle camera is used having a small f stop, thereby providing a large field of view where everything beyond approximately 1 meter is in focus.

Figure 7:
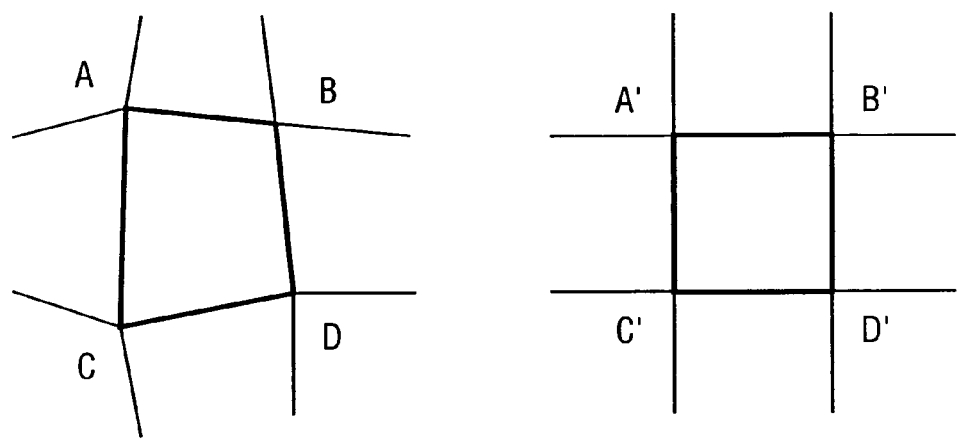
FIG. 7 is an example of a warping of a quadrilateral patch ABCD into a square A'B'C'D'.

Square patches on the cylinder (640, for example) are imaged as quadrilateral regions by one or more cameras. The imaged quadrilateral regions are illustrated, for example, as quadrilateral region ABCD as seen in FIG. 7, a patch, and may also be referred to as a source polygon. In the image composition stage, each quadrilateral region (source polygon, or patch) is warped back to a square, and the final panoramic image 650 (also referred to as a destination image) is composited by abutting each square in a grid (also referred to as placing the squares, or warped quadrilateral regions, into, a common coordinate system). Different camera images are merged by abutting adjacent squares in a grid (panoramic image 650).

Bilinear transformations are used to warp the quadrilateral regions (bilinear warping). Equation 1 below transform the homogeneous coordinate system u, v to the warped (square) coordinate system x, y.

$$[x\ y] = [u\ v\ uv\ 1] \begin{vmatrix} a0 & b0 \\ a1 & b1 \\ a2 & b2 \\ a3 & b3 \end{vmatrix} \quad (1)$$

Equation 1 is a transformation matrix having 8 unknown coefficients that are determined by solving the simultaneous equations given by the reference points (ABCD, in a coordinate system u, v, and A'B'C'D', in a coordinate system x, y). The four points in each system have 8 scalar values to solve for the 8 unknown parameters. If more correspondence points (correspondence points referring to the points encompassing the quadrilateral region (ABCD in this example) are present, an overdetermined set of equations results, which can be solved using least-squares (pseudoinverse) methods for more robust estimates.

The above processes are repeated for every patch (each patch captured by one or more cameras; at least two set of patches along borders of images one from each image to be combined; each path determined along a border of combined images), and using equation (1) (or an equivalent equation performing the same function for the areas selected), a set of warping coefficients (eight coefficients in this example) are computed for every patch. These, as well as the location of the square destination region in the composite image, are referred to as warping coefficients or a calibration set.

To calculate a pixel value in the warped coordinate system x, y, the above equations are inverted by solving for u, v in terms of x, y. This allows for what is termed "inverse mapping." For every pixel in the warped coordinate system, the corresponding pixel in the unwarped system is found and its value is copied.

The coefficients (of equation 1, for example) are stored in a table and utilized to warp images "on the fly." Because the cameras are fixed, and registered (or calibrated, see later section), the same equations are utilized over and over for the same patches (i.e., no need to find new correspondence or registration points, or recalculate coefficients).

Because the warping is a continuous function rather than discrete, the reverse mapping will generally yield non-integral unwarped coordinates. For this reason, the pixel value is interpolated from the neighbors using bilinear interpolation. This uses a linear combination of the four closest integral points to produce the interpolated value. Because the necessary perspective warping is never extreme for this application, there is no need for additional interpolation or filtering to reduce aliasing effects.

Other embodiments include different types of spatial transformations to warp patches from captured images (u, v coordinate system) to a composite grid (x, y coordinate system). Any spatial transformation altering the captured images to fit into a composite grid would be consistent with the present invention. For example, affine, or perspective transformations may be utilized.

A later section discusses finding registration points. In the current embodiment, registration is performed manually by inspecting each cameras' image. This is not an excessive burden as it need only be done once, and can be automated.

Figure 8:
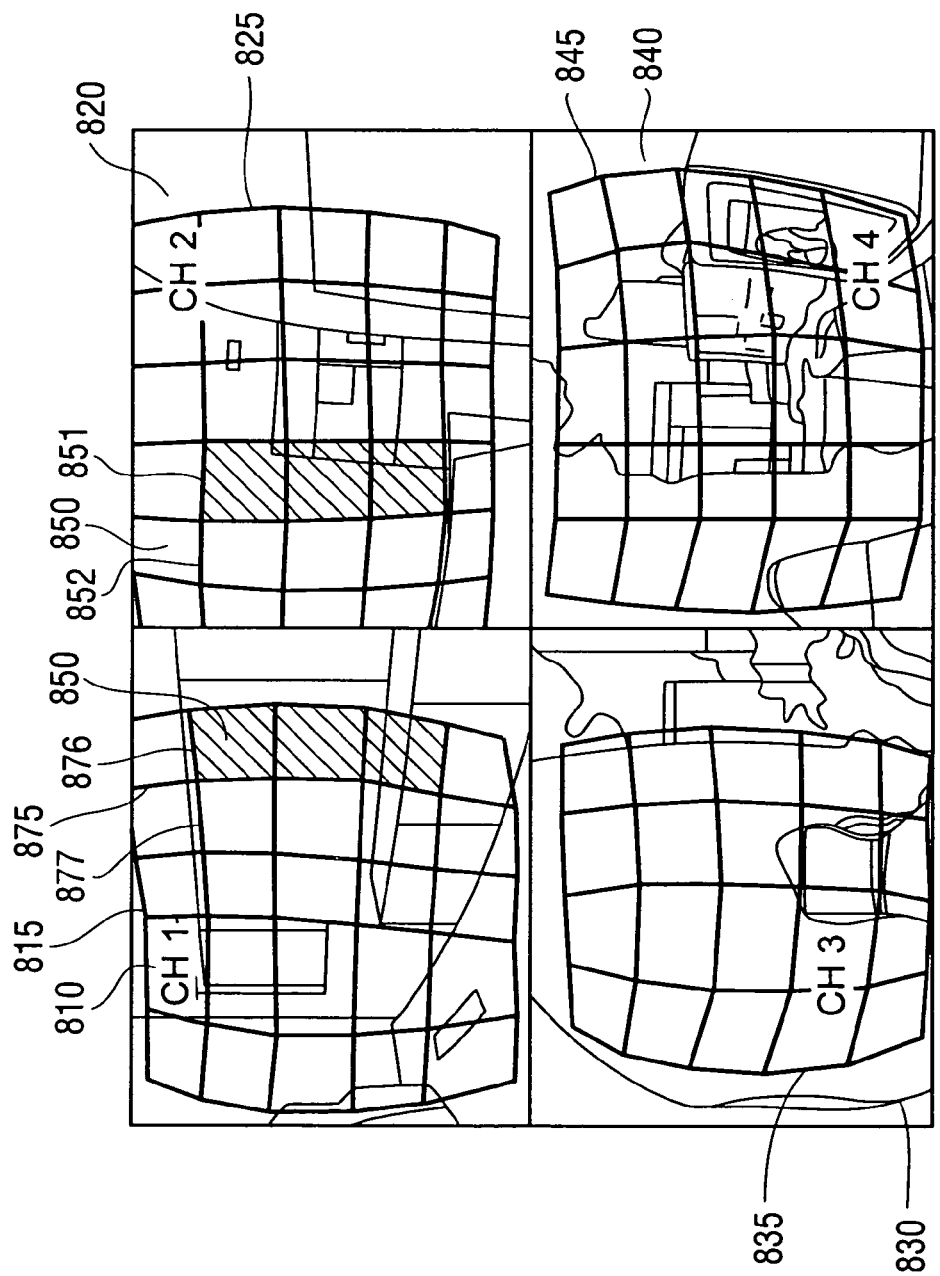
FIG. 8 is an example of images input from 4 sources showing patches.

FIG. 8 provides an example of calibration points and patches in raw images (images taken from a camera, without having any warping or other processing applied). Image 810, 820, 830 and 840 are abutting images taken from consecutively aligned cameras on a scene. Each image has a grid 815, 825, 835, and 845 having source polygons that will be warped into a common coordinate system resulting in a contiguous image of the scene. In addition, hatched columns 851 and 876 (seen in both camera images) are blended, while column 877 and column 852 may either utilized as is, discarded, or blended.

The present invention also includes correction for lens distortions in the fast warping equations. For example the camera lens' utilized in FIG. 8 show a substantial amount of lens bulge. Note the right edge of partition 850 shown on the right side of Image 810 (bulging to the right), and the right edge of partition 850 shown in the left side of Image 820 (bulging to the left). In one embodiment, correction of lens abnormalities or distortions is built into the fast warping equations (using a radial transformation, for example). In another embodiment, such abnormalities are corrected by increasing the number of patches (registration points), and the resulting warped images making a better approximation of the actual scene being imaged (a piecewise approximation of a continuous distortion).

Once the source polygons have been warped to a common coordinate system, a cross-fade can be utilized to combine them. Pixels for the merged image are determined by interpolating the two warped polygons. A linear interpolation can do this. The number and size of polygons can be adjusted as necessary to give a good mapping and reduce the appearance of "seams" in the composite image. "Seams" can be put at arbitrary locations by changing the interpolation function, for example, by using a piecewise linear interpolation function. This is especially useful when face locations are known, because the image combination can be biased such that seams do not cut across faces.

Figure 9:
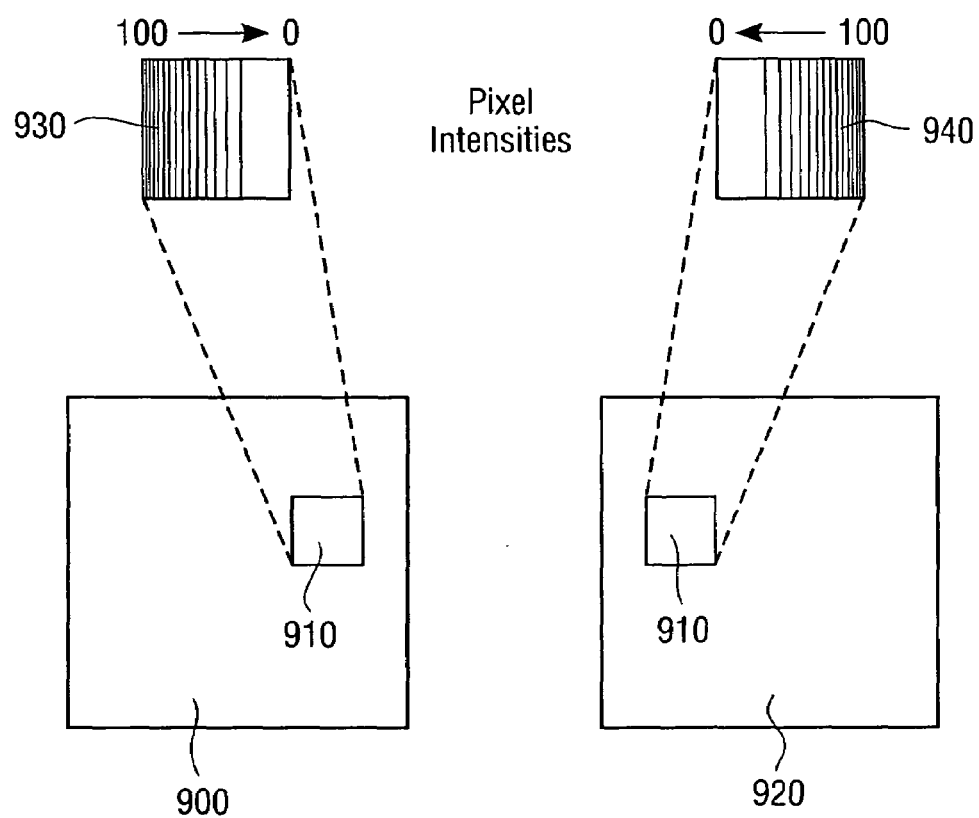
FIG. 9 is an illustration of a cross-fading technique according to the present invention.

In addition to warping, a significantly better image can be obtained by "cross-fading" patches, as illustrated by FIG. 9. In this process, two or more images of the same square must be obtained from different cameras. For example, cameras 900 and 920 of FIG. 9 each have imaged a same square 910. Each image is faded by reducing the pixel intensities across the patch (imaged square) in a linear fashion. For example the patch from the left camera 900 is faded so that pixel intensities fade to zero at the rightmost edge of the patch, while the leftmost are unchanged (see expanded patch 930). Conversely, the right camera patch is faded such that the leftmost pixels go to zero (see expanded patch 940). When the pixel intensities of right and left patches are added, the result is a patch image that smoothly blends the two images. This reduces artifacts due to camera separation and image intensity differences.

Patches for fading may be of any size or shape within the confines of a camera view. Therefore any geometric shape or outline of an object or other selected area within and two or more camera views may be selected for fading.

Alternatively, individual corresponding pixels in overlapping regions, after warping and matching those images, may be summed and averaged in some manner and then faded or blurred at edges or throughout the overlapping regions. As will be appreciated by those skilled in the art, in light of the present disclosure, many procedures, including fading, blurring, or averaging may be implemented to smooth transitions between the warped abutting and/or combined images.

Figure 10:
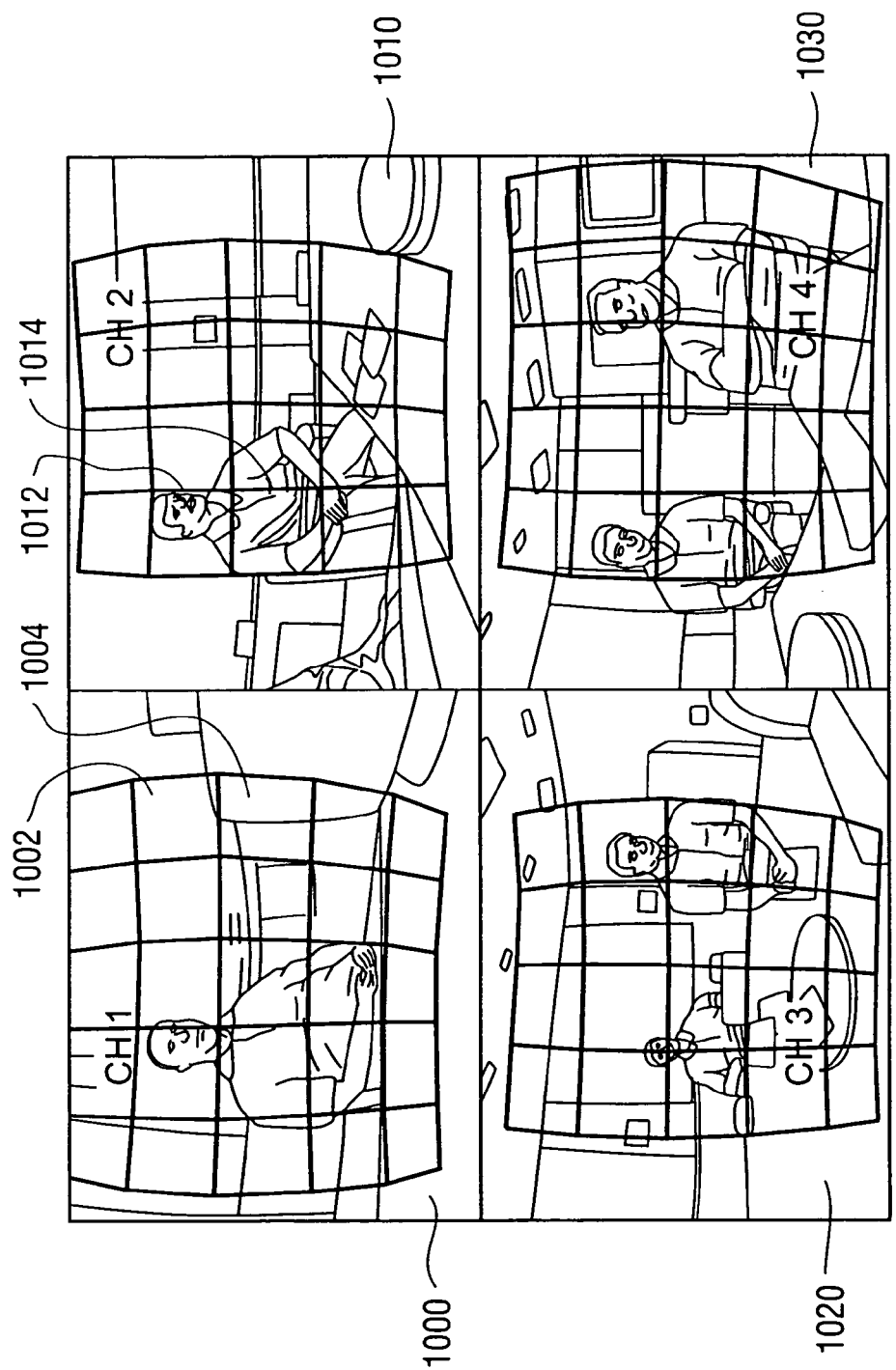
FIG. 10 is an illustration of multiple camera images and quadrilateral regions to be warped from each image.
Figure 11:
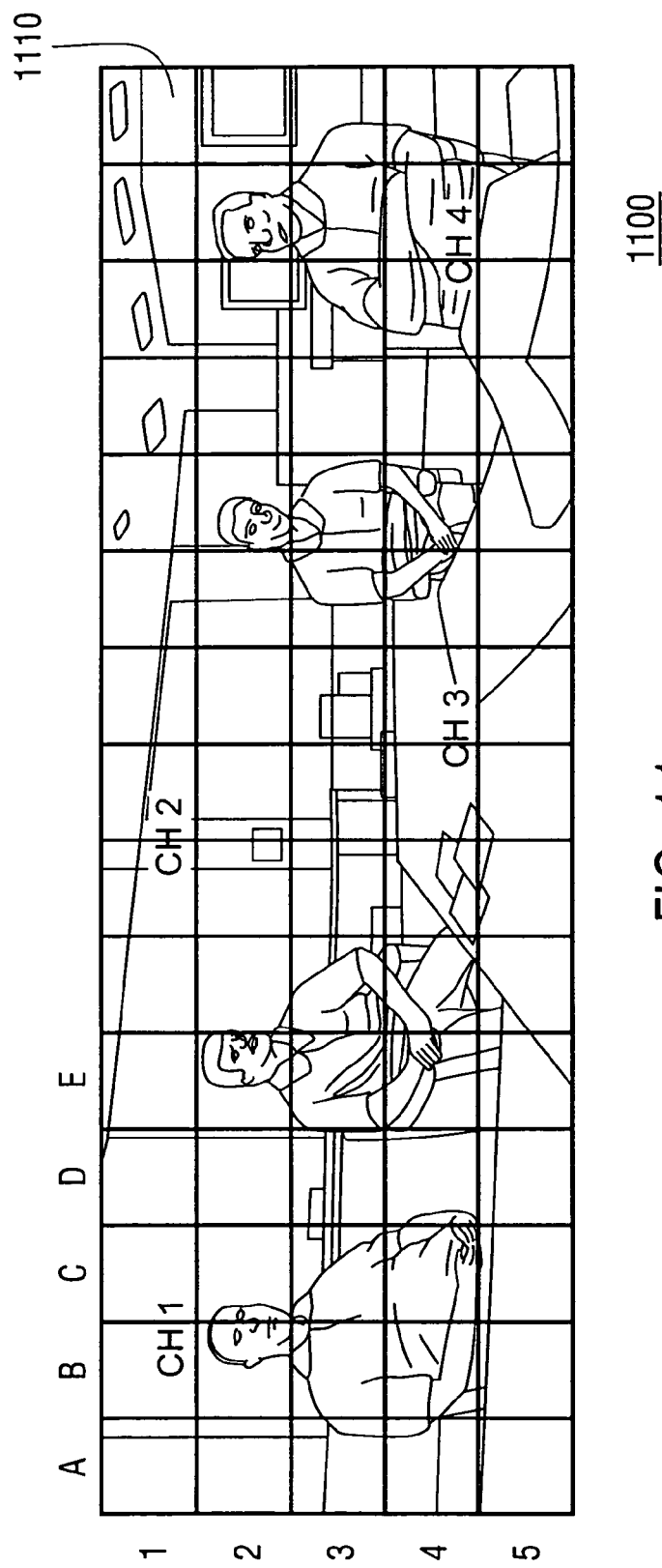
FIG. 11 is a composite panoramic image constructed from the patches (quadrilateral regions) illustrated in FIG. 8 according to the present invention.

FIGS. 10 and 11 show how multiple images can be integrated into a high-resolution composite. FIG. 10 illustrates images taken from cameras 1000 (CH1), 1010 (CH2), 1020 (CH3), and 1030 (CH4). Each of the images includes a set of quadrilateral grids to be warped into a final panoramic image.

FIG. 11 shows a composite 1100 of the images of FIG. 10 after warping, cross-fading and combined into a common coordinate system. FIG. 11 includes a grid 1110 corresponding to the common coordinate system, and is provided for reference. Note how the images are not only combined, but distortions are corrected. For example, the curved edges of the leftmost wall (along tiles A1 . . . A5) are straight in the composite.

Also note the effects of cross-fading to produce a seamless image. Quadrilateral regions 1002 and 1012, and 1004 and 1014 of the camera images are combined to produce grid squares E2 and E3 of the composite. Quadrilateral regions 1002 and 1004 of CH1 are darker than corresponding regions 1012 and 1014 of CH2, as is common in similar views from different cameras. However, when combined the rightmost portions of grid squares E2 and E3 are light (as in quadrilateral regions 1012 and 1014), while the leftmost regions of grid squares (E2 and E3) are dark (as in quadrilateral regions 1002 and 1004), and no seams are present.

Figure 12:
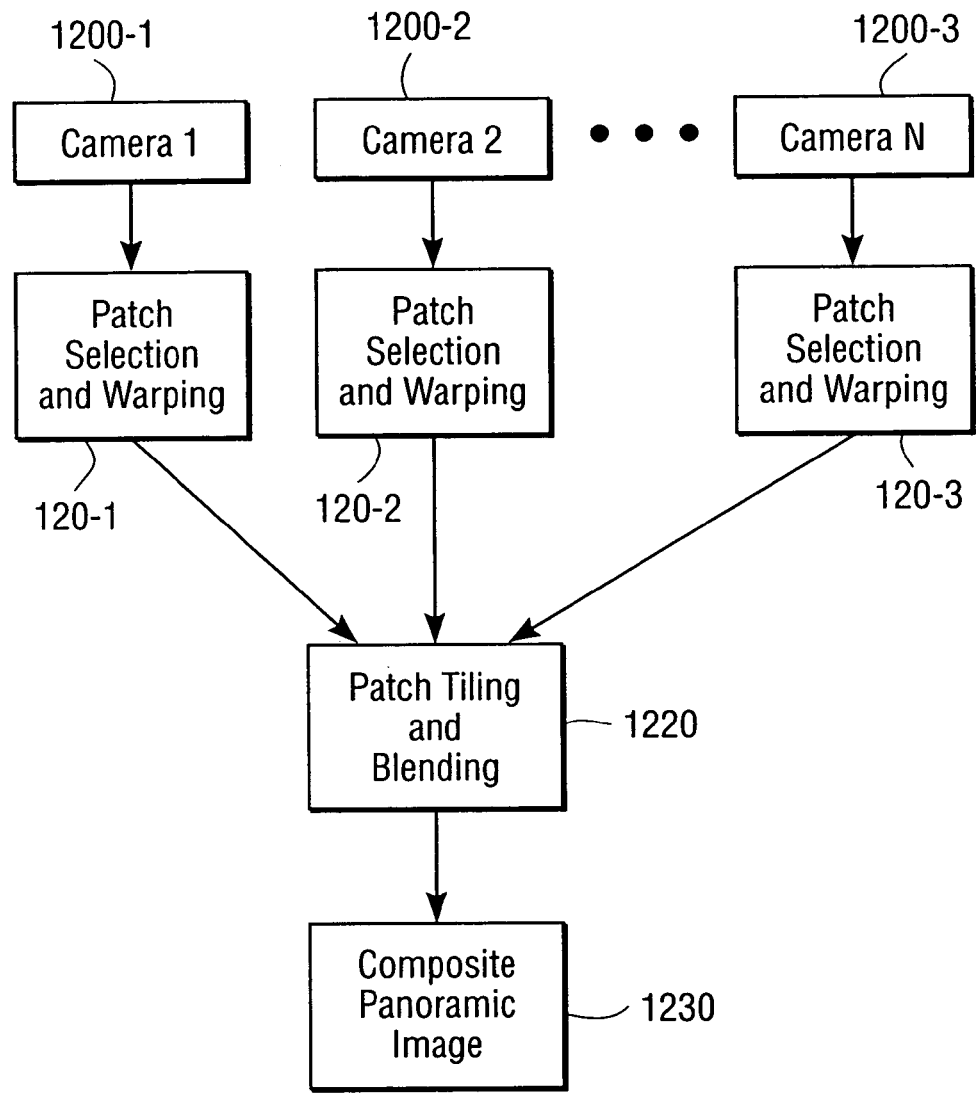
FIG. 12 is a flow diagram illustrating an image composition procedure for each frame in a video sequence.

FIG. 12 is a flow diagram illustrating the steps for compositing each video frame. In this flow, 3 cameras (1200-1, 1200-2, and 1200-3) each provide one image to be combined as part of a composite panoramic image. At steps 1210-1, 1210-2, and 1210-3, each of the images are processed by selecting patches (quadrilateral regions) and warped into a space for fitting into a common coordinate system. At step 1220, the warped quadrilateral regions (patches) are cross-faded or other technique for eliminating edges and seams, and placed in tiles (the common coordinate system, for example). Upon completion, the composite panoramic image is available for display, selection, storage or other processes (step 1230). Note that this procedure, including all data transfer and warping, using currently available processing speeds, can be performed at video rates of 10–30 frames per second.

Automatic Control of Virtual Cameras

Mechanically-steered cameras are constrained by the limitations of the mechanical systems that orient them. A particular advantage of virtual cameras is that they can be panned/zoomed virtually instantaneously, with none of the speed limitations due to moving a physical camera and/or lens. In addition, moving cameras can be distracting, especially when directly in the subject's field of view, like the conference-table camera shown in FIG. 3.

In this system, we can select one or more normal-resolution "virtual camera" images from the panoramic image. Mechanical cameras are constrained by the fact that they can be pointed in only one direction. A camera array suffers no such limitation; an unlimited number of images at different pans and zooms can be extracted from the panoramic image. We use information from the entire composite image to automatically select the best sub-images using motion analysis, audio source location, and face tracking. To reduce the computation load, parts of the panoramic image not used to compose the virtual images could be analyzed at a slower frame rate, resolution, or in greyscale.

A useful application of camera arrays is as a wide-field motion sensor. In this case, a camera array is fixed at a known location in a room. Areas of the room will correspond to fixed locations in the image plane of one or more cameras. Thus using a lookup table or similar method, detecting motion in a particular region of a video image can be used to find the corresponding spatial location of the motion. This is enough information to point another camera in the appropriate direction, for example. Multiple cameras or arrays can be used to eliminate range ambiguity by placing their field of view at right angles, for example, at different room corners.

Another useful system consists of conventional steerable cameras and a camera-array motion sensor. Motion in a particular location would set appropriate camera pan/zoom parameters such that a subject is captured. For example, in FIG. 4C, motion above the podium would signal the appropriate camera to move to a location preset to capture a podium speaker. This mode of operation is computationally cheap, and less expensive B/W cameras could be used in the camera array, as the resultant image need not be shown. This could have significant savings in processing as well, as three B/W cameras could be multiplexed on one RGB video signal.

Depth Map Creation from Parallax

Because it is impractical to make a camera array with coincident optics (that is, all the cameras optically in the same place), camera pairs will have a small but significant baseline separation. This is a problem when combining images of objects at different distances from the baseline, as a single warping function will only work perfectly for one particular distance. Objects not at that distance will be warped into different places and will appear doubled ("ghosted") or truncated when the images are merged. In practice, this is not a problem, as the camera array can be calibrated for a typical distance (say one meter for teleconferencing) and patch blending minimizes objectionable artifacts from objects not at that distance. Another solution is to calculate a number of warping coefficients for objects at different distances; the appropriate set could then be selected.

A better solution is to take advantage of the parallax (stereo disparity) to find a range of the objects being imaged. In this solution, the camera array is calibrated such that patches at infinity can be combined with no disparity.

Looking at each patch (or smaller subdivision of larger patches) the stereo disparity can be found by finding how much to shift one patch to match the other. This type of camera calibration greatly simplifies the stereo matching problem, turning it into essentially a one-dimensional search. Because patches are warped into corresponding squares, all that is necessary is to find the shift that will match them. This solution avoids complexity due to lens distortion. A one-dimensional (1-D) correlation will be a maximum at the lag with greatest overlap across a row of pixels in a patch.

The height of the maximum peak indicates the confidence of the image match. Attempting to match smooth or featureless regions will result in a low peak, while richly textured images will have a sharp peak. If it is desired to find the range of moving objects such as humans, the above technique can be used on the frame-by-frame pixel difference for more robust disparity estimates.

The lag of the correlation peak depends directly on the distance of the object in that patch. This will not have high resolution due to the small camera baseline, and will often be noisy, but still is able to detect, for example, the position of humans sitting around a conference table. Patches are small, on the order of 10–50 pixels, and can be overlapped for greater spatial detail, as there will be only one disparity estimate per patch. The result is a grid of disparity estimates and their associated confidence scores. These are smoothed using spatial filtering such as a median filter, and low-confidence points either ignored or replaced with an estimate derived from neighboring points.

The disparity estimates have a number of applications. An immediate application is to estimate the location and number of objects or humans in the array's field of view. This is done by looking for local peaks of the right spatial frequency in the smoothed disparity map (a smoothing of the grid of disparity estimates for each patch), using template matching or a similar technique. Once the positions are estimated, the virtual cameras can be "snapped to" the object locations ensuring they are always in the center of view.

Another application is to ensure that camera seams do not intersect objects. Because the individual camera views overlap by several patches, it is straightforward to blend only those patches that do not have significant disparity estimates, that is, contain only background images instead of objects.

Yet another application is to segment the panoramic images into foreground and background images. Once again, this task is simplified by the fact that the camera array is fixed with respect to the background. Any image motion is thereby due to objects and objects alone. Patches with no significant motion or disparity are background images. As long as foreground objects move enough to reveal the background, the background can be robustly extracted. The difference between any given image and the background image will be solely due to foreground objects. These images can then be extracted and used for other applications; for example, there is no need to retransmit the unchanging background. Significant bandwidth savings can be gained by only transmitting the changing object images (as recognized in the MPEG-4 video standard).

Camera Control Using Video Analysis

In one embodiment, a motion analysis serves to control a virtual camera; that is, to select the portion of the panoramic image that contains the moving object. Motion is determined by computing the frame-to-frame pixel differences of the panoramic image. This is thresholded at a moderate value to remove noise, and the center of gravity (first spatial moment) of the resulting motion image is used to update the center of the virtual image. The new virtual image location is computed as the weighted average of the old location and the motion center of gravity. The weight can be adjusted to change the "inertia," that is, the speed at which the virtual camera changes location. Giving the previous location a large weight smooths jitter from the motion estimate, but slows the overall panning speed. A small weight means the virtual camera responds quickly to changes in the motion location, but may jitter randomly due to small-scale object motion.

Tracking can be further improved by adding a hysteresis value such that the virtual camera is changed only when the new location estimate differs from the previous one by more than a certain amount. The motion centroid is averaged across both a short and a long time span. If the short-time average exceeds the long-time average by a preset amount, the camera view is changed to that location. This accounts for "false alarm" events from both stable sources of image motion (the second hand of a clock or fluorescent light flicker) as well as short-term motion events such as a sneeze or dropped pencil). This smooths jitter, but constant object motion results in a series of jumps in the virtual camera position, as the hysteresis threshold is exceeded.

Other enhancements to the motion detection algorithm include spatial and temporal filtering, for example, emphasizing hand gestures at the expense of nodding or shifting. In operation, the virtual camera is initially zoomed out or put in a neutral mode, which typically includes everything in the camera's view. If a radial array is used, as in FIG. 3, the composite image will have a narrow aspect ratio, that is, will be wider than it is high. In this case, the neutral view can be "letterboxed" into a normal-aspect frame by reducing it in size and padding it with black or another color.

Alternatively, the neutral position could be a "Brady Bunch" view where the large image is broken into units to tile the normal-aspect frame. The output of a face tracker ensures that all participants are in view, and that the image breaks do not happen across a participant's face.

If motion is detected from more than one region, several heuristics can be used. The simplest is to just choose the region with the largest motion signal and proceed as before. Another option might be to zoom back the camera view so that all motion sources are in view. In the case of conflicting or zero motion information, the camera can be changed back to the default neutral view.

Another useful heuristic is to discourage overlong scenes of the same location, which are visually uninteresting. Once the virtual camera location has been significantly changed, a timer is started. As the timer value increases, the motion change threshold is decreased. This can be done in such a way that the mean or the statistical distribution of shot lengths matches some pre-determined or experimentally determined parameters. Another camera change resets the timer. The net effect is to encourage human-like camera operation. For example, if the camera has been focused on a particular speaker for some time, it is likely that the camera would cut away to capture a listener nodding in agreement, which adds to the realism and interest of the video, and mimics the performance of a human operator.

All the above techniques can be combined with the object locations estimated from the disparity map.

Audio Control of Virtual Cameras

Using microphone arrays to determine the location and direction of acoustic sources is known. These typically use complicated and computationally intensive beamforming algorithms. However, a more straightforward approach may be utilized for determining a direction of a speaker at a table, or from which side of a room (presenter or audience) speech is coming from. This information, perhaps combined with video cues, a camera can be automatically steered to capture the speaker or speakers (using the methods of the previous sections).

Figure 13:
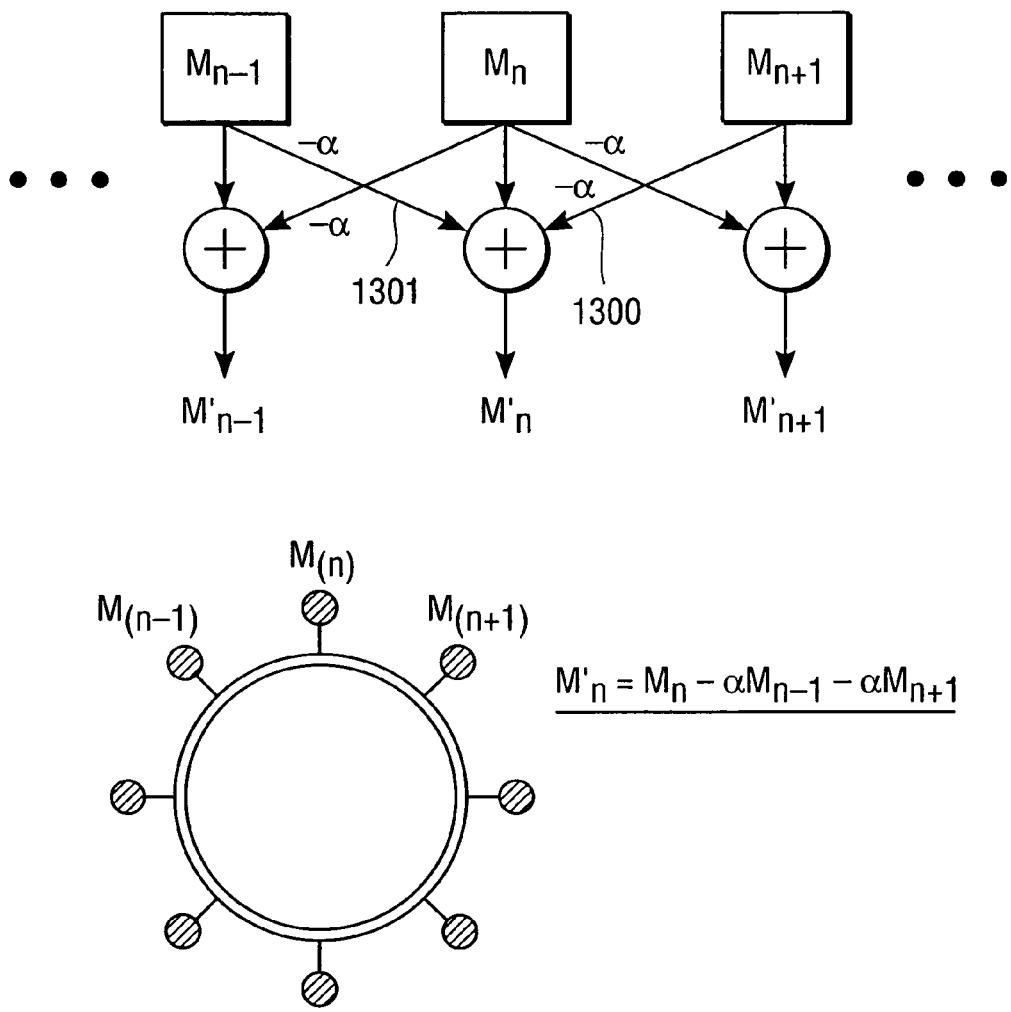
FIG. 13 is a diagram illustrating a radial microphone array.

While conventional beamforming relies on phase differences to estimate the direction and distance of an acoustic source, the present inventors have realized that a good estimate can be obtained by using the amplitude of an acoustic signal. The system presented here uses an array of directional microphones aligned around a circle as shown in FIG. 13. Such an array is placed in the center of a meeting table or conference room. If the microphones are sufficiently directional, then the microphone with the highest average magnitude should indicate the rough direction of an acoustic source.

Adverse effects, such as acoustic reflections (not least off walls and tables), and the imperfect directionality of real microphones (most cardioid microphones have a substantial response at 180 degrees to their axis) are minimized by the present invention.

In one embodiment, the present invention utilizes a pre-filtering of the acoustic signal to frequencies of interest (e.g. the speech region) helps to reject out-of-band noise like ventilation hum or computer fan noise.

In addition, lateral inhibition is utilized to enhance microphone directionality. In one embodiment, lateral inhibition is done by subtracting a fraction of the average signal magnitude from each neighboring microphone. The time-averaged magnitude from each microphone is denoted |M| as illustrated in FIG. 13. A small fraction $\alpha<1$ ($\alpha 1300$ and $\alpha 1301$ subtracted from Mn, for example) is subtracted from each of the neighbor microphones. This sharpens the spatial resolution from each microphone. The neighbor dependence can be increased beyond nearest neighbors if necessary. If the subtraction is done in the amplitude or energy domain, then problems due to phase cancellation and reinforcement are avoided altogether. The result is to sharpen the directionality of each microphone.

In one embodiment, the system is normalized for ambient conditions by subtracting the ambient energy incident on each microphone due to constant sources such as ventilation. When the system is running, each microphone will generate a real-time estimate of the acoustic energy in its "field of view." It might be possible to get higher angular resolution than the number of microphones by interpolation.

A more robust system estimates the location of an acoustic source by finding peaks or corresponding features in the acoustic signals from each microphone. Because of the finite speed of sound, the acoustic signal will arrive first at the microphone closest to the source. Given the time delay between peaks, the first-arriving peak will correspond to the closest microphone. Given delay estimates to microphones at known locations, geometrical constraints can be used to find the angular direction of the source.

In a complex environment with many reflections, the statistics of reflections may be learned from training data to characterize the angular location of the source. Combining this with the amplitude cues above will result in an even more robust audio location estimate.

A system with particular application to teleconferencing consists of one or more desk microphones on flexible cords. In use, microphones are placed in front of each conference participant. Each microphone is equipped with a controllable beacon of visible or invisible IR light. The beacon is set to flash at a rate comparable to ½ the video frame rate. Thus there will be frames where the beacon is illuminated in close temporal proximity to frames where the beacon is dark. Subtracting these frames will leave a bright spot corresponding to the beacon; all other image features will cancel out. From this method the location of the microphones in the panoramic image can be determined. Audio energy detected at each particular microphone can give a clue to shift the virtual image to that microphone.

Camera Control Using Audio

Given the angular direction and the magnitude signals from the various microphones, cameras can be controlled using algorithms similar to those described for motion above. Short-term and long-term averages can accommodate fixed noise sources like computer fans. A number of heuristics are used to integrate face and/or motion detection with the audio source location. The audio direction is used as an initial estimate of speaker location to start the face tracking system. Additionally, both face tracking and audio source location can be used in concert. Thus an object must both be recognized as a face and be an audio source before the camera is steered towards it. This is particularly useful for the automatic teleconferencing system that aims to display the image of the person speaking.

Stereo Ranging

Since the present invention utilizes multiple cameras, stereo range of object in the scene to be imaged may be performed. Conference room walls would be considered at a maximum range, but any object closer to the camera would be considered to be more likely subjects for moving focus of a virtual view of the image. If stereo ranging determines an object is closer than the conference room walls, and it is moving (motion detection via video analysis, for example) it is more likely to be a subject. If audio detection is also added, the object can be determined with even a higher degree of certainty to be a subject for zooming in. The present invention includes an embodiment utilizing a combination of all analysis functions, audio, video motion detection, and stereo ranging to determine a likely subject for camera zooming.

Data Manipulation and Compression

Multiple video cameras require techniques to cope with the sheer amount of generated video data. However, it is quite possible to composite multiple video streams in real time on a common CPU, and this should scale with increasing processor speed and parallelization. It is possible to stream each camera to a plurality of analog or digital recording devices, such that all camera views are recorded in real time. The recorded streams can then be composited using the same methods at a later time. Another approach is to store the composited high-resolution video image in a format that can support it.

Many common video formats such as MPEG support arbitrarily large frame sizes. Recording a full-resolution image has many advantages over prior art: first of all multiple views can still be synthesized from the high-resolution image, which may support varied uses of the source material. For example, in a videotaped lecture, one student might prefer slide images while a hearing-impaired but lip-reading student might prefer the lecturer's image. Recording a full-resolution image also allows better automatic control. Because any real-time camera control algorithm can't look ahead to future events, it is possible to get better control using a lag of several seconds to a minute.

Thus switching to a different audio or motion source could be done instantaneously rather than waiting for the short-term average to reach a threshold.

Existing standards like MPEG already support frames of arbitrary resolution provided they are rectangular. It is possible to composite images using MPEG macroblocks rather than in the pixel domain for potentially substantial savings in both storage and computation. The multi-stream approach has the advantage that only the streams needed for a particular application need be considered.

For example, when synthesizing a virtual camera from a circular array ("B" of FIG. 3, for example), a likely application would only require, at most, two streams of video to be considered at any one time. When combined with the fast warping techniques associated with the present invention, such processing is well within the capacity of a desktop PC.

A reverse embodiment is also envisioned: extracting normal-resolution video from a super-resolution MPEG stream is merely a matter of selecting and decoding the appropriate macroblocks. Given bandwidth constraints, a panoramic video image may be efficiently transmitted by sending only those regions that have changed significantly. This technique is commonly used in low-bandwidth video formats such as H.261. A novel adaptation of this method is to only store or transmit image regions corresponding to moving faces or a significant audio source such as a speaker.

Automatic Camera Registration

In order to merge overlapping images from different cameras, they must be registered such that lens and imaging distortion can be identified and corrected. This is particularly important with embodiments of the present invention that utilize the matrix coefficients, as they are premised on registered cameras. Generally, it is envisioned that cameras in the arrays will be fixed with respect to one another, and that registration will be performed at time of manufacture.

The present invention includes registering array cameras that are fixed with respect to each other. Registering cameras involves finding points that correspond in each image. This can be done manually, by observing two views of the same scene and determining which pixels in each image correspond to the same point in the image plane. Because cameras are fixed with respect to each other, this need only be done once and may be performed automatically. Manual registration involves locating registration points manually, say by pointing the camera array at a structured image such as a grid, and locating grid intersection points on corresponding images. Using machine-vision techniques, this could be done automatically.

Figure 14:
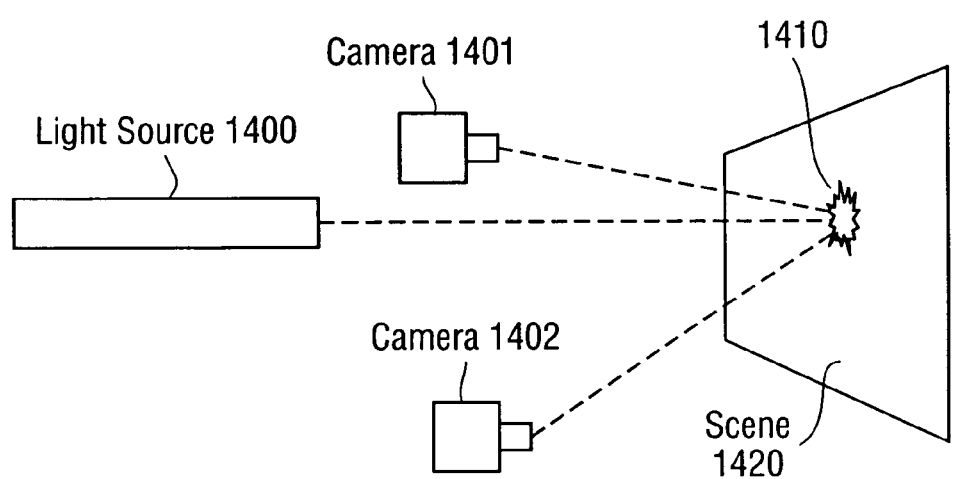
FIG. 14 is a diagram of an automatic camera calibration system using a light source to find registration points.

In one embodiment, registration is performed using a "structured light" method (e.g. a visible or IR laser spot swept over the camera array's field of view, as shown in FIG. 14). In this example, a semiconductor laser 1400 (other types of light sources may be utilized, a focused infrared beam, for example) is arranged to project a bright spot 1410 of visible red or infrared light on a scene 1420 to be imaged. An image from each camera (camera 1401 and 1402, in this example) is then analyzed to detect the spot location, which then serves as a registration point for all cameras that have it in view.

Because the spot 1410 is orders of magnitude brighter than any projected image, detection can be performed by thresholding the red channel of the color image (other detection methods are also envisioned, color differences, or analyzing a combination of shape and brightness, for example). The spot 1410 also needs to be moved to find multiple registration points. This could be done using a rotating mirror or other optical apparatus, using multiple lasers (which are inexpensive), or by affixing a laser to a mechanically steered camera as described previously.

Another version of this system uses bright IR or visible LEDs affixed to a rigid substrate. Lighting the LEDs in succession provides registration points. The substrate can be moved to the approximate imaging error so that parallax is minimized at those points.

Figure 15:
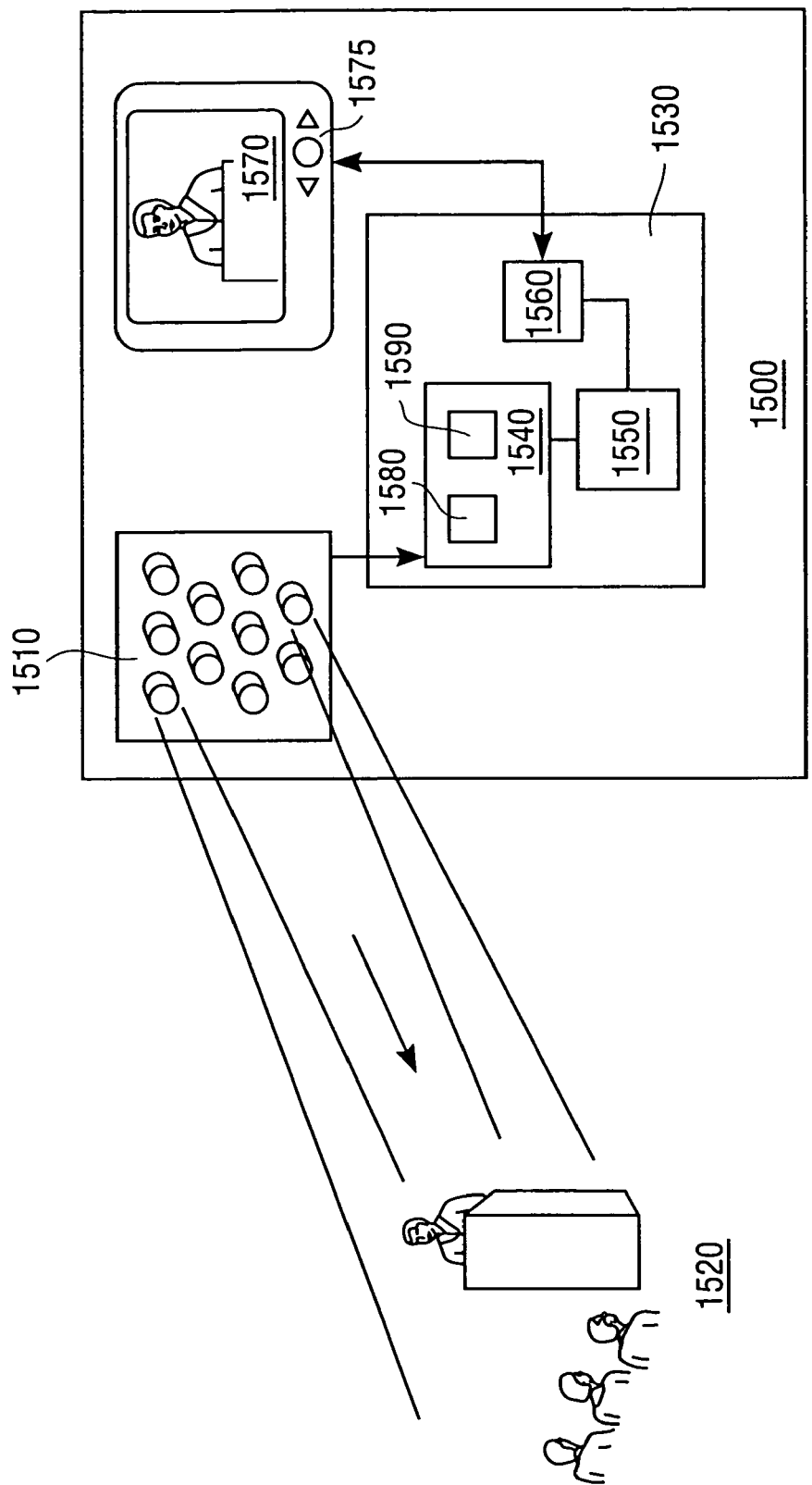
FIG. 15 is a block diagram of an embodiment of the present invention having a selection device for selecting a view from a combined image.

One embodiment of the present invention is illustrated in the block diagram of FIG. 15. FIG. 15 illustrates a video system 1500 having a camera array 1510, a combining device 1530, a view selection device 1560, and an output mechanism 1570. The camera array 1510 is trained on a conference lecture 1520. Images from the camera array 1510 are input to the combining device, are combined in a combining device 1540 using any of the above processes (warping via a warping mechanism 1580, and cross fading via a fading device 1590, for example). In this embodiment, the combined image is stored in a memory 1550, and the view selection device 1560 selects a part of the combined image for display on output mechanism 1570. The view selection device may make its selection based on inputs from a user input via input mechanism 1575 (a trackball, mouse or keyboard, for example), or it may automatically select a view based on the above discussed audio inputs, stereoscopic ranging, or video motion analysis.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, inserting anchors into work artifacts, communication with application programming interfaces of various applications, initiating communications and communication clients, maintaining relative positions of conversation or communication clients to corresponding anchors in a work artifact, retrieving and logging conversations, requesting and handling communications requests, managing connections, initiating applications and downloading artifacts, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A method, comprising:
   providing a camera array, the camera array including a plurality of cameras;
   providing a set of camera offset values for the camera array;
   synchronously capturing a set of images from the camera array;
   selecting pixels from at least one image of said set of images;
   applying a bilinear transformation to the selected pixels to transform the selected pixels from a coordinate system of the at least one image to a common coordinate system of a composite image;
   wherein applying a bilinear transformation includes using the set of camera offset values.

2. The method according to claim 1, wherein selecting pixels includes identifying contiguous patches in said set of images.

3. The method according to claim 2, wherein identifying contiguous patches, includes identifying pixels from the contiguous patches having registration points in common with said composite image.

4. The method according to claim 2, further comprising:
   combining pixels from the contiguous patches having substantially similar registration points into a common location of said composite image.

5. The method according to claim 4, wherein combining pixels from the contiguous patches includes cross-fading pixels having substantially similar registration points having a substantially similar registration points into the common location of said composite image.

6. The method according to claim 4, wherein combining pixels from the contiguous patches includes at least one of cross-fading, blurring, averaging, and other image effects to seamlessly combine said pixels from different patches having substantially similar registration points into the common location of said composite image.

7. The method according to claim 2, wherein performing a transformation includes applying a predetermined bilinear transformation matrix to each patch, said predetermined bilinear transformation matrix representing an amount of warping required for each patch to transform each patch into said common coordinate system.

8. The method according to claim 1, further comprising repeating said applying a transformative equation for each set of images synchronously captured by said camera array, each set of images representing one frame in a video stream of said scene.

9. The method according to claim 1, further comprising selecting an area of interest from the composite image; and
   outputting the selected area of interest to a user.

10. The method according to claim 9, wherein said outputting comprises displaying said area of interest from the combined warped images.

11. The method according to claim 9, wherein said selecting comprises:
    directing said area of interest to a predetermined area surrounding at least one of motion detected in said scene, audio sources detected within said scene, and proximity of objects detected in said scene.

12. A method, comprising:
    synchronously capturing a set of images from a camera array;
    selecting pixels from at least one image from the set of images;
    identifying contiguous patches from the selected pixels;
    transforming the selected pixels from a coordinate system of the at least one image to a common coordinate system;
    determining overlap between the contiguous patches, wherein overlapping contiguous patches include pixels having substantially similar registration points;
    combining overlapping contiguous patches into a common location of said a composite image;
    wherein combining overlapping contiguous patches includes cross-fading pixels having substantially similar registration points into the common location of said composite image;
    wherein cross-fading includes:
       varying a parameter of the pixels having substantially similar registration points from a first patch from a minimum value at a first boundary of said first patch to a maximum value at an opposite boundary of said first patch;
       varying said parameter of the pixels having substantially similar registration points from a second patch from said maximum value at a boundary of said second patch corresponding to said first boundary to said minimum value at a boundary of said second patch corresponding to said opposite boundary;
       summing corresponding pixel values of said first patch and said second patch; and
    placing the summed values in corresponding locations of said common coordinate system.

13. The method according to claim 12, wherein said parameter is at least one of brightness, contrast, and intensity.

14. A camera array, comprising:
    a set of cameras mounted in an array;
    a set of camera offset values for the set of cameras;
    an image combining mechanism configured to combine at least two of images captured from said set of cameras into a composite image, the image combining mechanism including:
       a warping device configured to warp patches of each image into a common coordinate system of said composite image by applying a bilinear transformation;
       wherein the warping device applies the set of camera offset values to warp patches;
    a view selection device configured to select a view from the composite image; and
    an output mechanism configured to display the selected view.

15. The camera array according to claim 14, wherein said image combining mechanism includes,
    a fading device configured to fade and combine patches having a same location in said composite image.

16. The camera array according to claim 15, wherein:
said array of cameras are immovably mounted on a firm fixed base; and
said warping device applies a pre-determined transformation to each of said patches.

17. The camera array according to claim 15, further comprising a registration mechanism configured to register each of said camera arrays by finding registration points in common with views of each camera and said composite image.

18. The camera array according to claim 14, wherein said view selection device includes:
at least one of,
a video motion detector configured to detect motion in the composite image,
a sound detection device configured to determine a location of sound originating within said composite image, and
a stereoscopic ranging mechanism configured to utilize at least two images from separate cameras of said camera array to determine a range of objects in said composite image; and
a detection mechanism configured to automatically detect any of a face, shape, color, and motion of a subject for inclusion in said selected frame based on at least one of ranging data from said stereoscopic ranging mechanism, location data from said sound detection device, and motion detected by said video motion detector.

19. A camera array comprising:
a plurality of cameras;
an image combining mechanism configured to combine at least two images captured from said plurality of cameras into a composite image, the image combining mechanism including:
a registration mechanism configured to register said plurality of cameras by finding registration points in common with views of the plurality of cameras and said composite image, the registration mechanism including:
a registration point source directable to locations within said views of the plurality of cameras, and
a detection mechanism configured to detect said registration point source and register the detected registration point source in said views of the plurality of cameras with respect to a coordinate system of said composite image.

20. The camera array according to claim 19, wherein said registration point source is at least one of a light source directed into view of said camera array and a grid placed in view of said camera array.

21. A method of registering a camera array, comprising:
placing at least one registration point in a field of view of at least two cameras of said camera array;
identifying a location of each registration point in a field of view of each camera of said array;
calculating a warped coordinate system for placing pixels of said cameras; and
maintaining a table identifying pixels of said cameras, an amount of fade, and a corresponding location in the warped coordinate system such that images can be combined in relation to said registration points.

22. The method according to claim 21, wherein said step placing comprises the steps of:
sweeping an beam light source across a field of view of at least two cameras of said camera array.

23. The method according to claim 21, wherein said step of placing comprises the step of:
placing a grid of known location in a field of view in at least two cameras of said array.

24. A method, comprising:
providing a camera array, the camera array including a plurality of cameras;
providing a set of camera offset values for the camera array;
synchronously capturing a set of images from the camera array;
selecting pixels from at least one image of said set of images; and
applying a transformative equation to the selected pixels to transform the selected pixels from a coordinate system of the at least one image to a common coordinate system of a composite image;
wherein said transformative equation is at least one of a bilinear transformation, a radial transformation, and an affine transformation;
wherein applying a transformative equation includes using the set of camera offset.

* * * * *